United States Patent
Wu et al.

(10) Patent No.: US 12,112,165 B2
(45) Date of Patent: Oct. 8, 2024

(54) MANAGING STATUS INFORMATION OF LOGIC UNITS

(71) Applicant: Macronix International Co., Ltd., Hsinchu (TW)

(72) Inventors: Sheng-Lun Wu, Toufen (TW); Chun-Lien Su, Taichung (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 17/956,155

(22) Filed: Sep. 29, 2022

(65) Prior Publication Data

US 2024/0111527 A1   Apr. 4, 2024

(51) Int. Cl.
| | |
|---|---|
| *G06F 9/30* | (2018.01) |
| *G06F 1/08* | (2006.01) |
| *G06F 9/54* | (2006.01) |

(52) U.S. Cl.
CPC ............ *G06F 9/30021* (2013.01); *G06F 1/08* (2013.01); *G06F 9/544* (2013.01)

(58) Field of Classification Search
CPC ......... G06F 9/30021; G06F 1/08; G06F 9/544
See application file for complete search history.

(56) References Cited

U.S. PATENT DOCUMENTS

| | | | | |
|---|---|---|---|---|
| 6,683,876 B1 * | 1/2004 | Tornes | ................... | H04L 49/30 370/465 |
| 8,010,708 B2 * | 8/2011 | Balasubramanian | ........................ | G06F 9/4411 710/10 |
| 10,235,309 B1 * | 3/2019 | Markus | ................ | G06F 11/3027 |
| 11,593,262 B1 * | 2/2023 | Henze | .................. | G06F 12/0238 |
| 2009/0089492 A1 * | 4/2009 | Yoon | .................... | G06F 13/1689 711/E12.001 |
| 2011/0258366 A1 * | 10/2011 | Schuetz | ............... | G11C 7/1063 711/E12.008 |
| 2013/0013969 A1 | 1/2013 | Rajarao et al. | | |
| 2013/0339638 A1 * | 12/2013 | Lazmi | ................. | G06F 13/1684 711/E12.001 |
| 2017/0315851 A1 * | 11/2017 | Hicks | .................. | G06F 11/0793 |
| 2018/0210652 A1 * | 7/2018 | Chen | ......................... | G06F 1/08 |

(Continued)

FOREIGN PATENT DOCUMENTS

| | | |
|---|---|---|
| CN | 105224488 | 1/2016 |
| CN | 114036096 | 2/2022 |

(Continued)

*Primary Examiner* — Mark A Giardino, Jr.
(74) *Attorney, Agent, or Firm* — Fish & Richardson P.C.

(57) ABSTRACT

Systems, methods, and apparatus including computer-readable mediums for managing status information of logic units are provided. In one aspect, a device includes a semiconductor device including one or more logic units and a reporting bus and a controller coupled to the semiconductor device and configured to store status information of the one or more logic units in the semiconductor device. Each of the one or more logic units is configured to send information associated with the logic unit using a corresponding reporting unit in the semiconductor device through the reporting bus to the controller to indicate a status of the logic unit. The controller is configured to, in response to receiving the information associated with the logic unit, update corresponding status information of the logic unit based on the status of the logic unit.

22 Claims, 14 Drawing Sheets

(56) References Cited

U.S. PATENT DOCUMENTS

2020/0192834 A1    6/2020  Solomon et al.
2022/0091775 A1*  3/2022  Shridhar ............... G06F 3/0655

FOREIGN PATENT DOCUMENTS

| TW | 201532047 | 8/2015 |
| TW | 202225946 | 7/2022 |

* cited by examiner

MANAGING STATUS INFORMATION OF LOGIC UNITS

BACKGROUND

High-density memory devices, e.g., three-dimensional (3D) NAND flash memory devices, are attractive due to the capability to increase an array density by stacking more layers within a similar footprint. A high-density memory device usually includes a large number of logic units. A ready/busy (R/B #) pin can be used to indicate a status of a device or unit. To maximize the performance of the memory device, each logic unit can be accessed individually by a separated chip enable (CE) pin, a separated logic unit pin coded with a logic unit address, and a separated read/busy (R/B #) pin. However, cost and package limit pin counts for the high-density memory device.

SUMMARY

The present disclosure describes systems, devices, methods, and techniques for managing status information of logic units, e.g., in memory devices such as a non-volatile memory device such as a 3D NAND flash memory device, which can accurately and efficiently get the status information of the logic units using shared reporting pins.

One aspect of the present disclosure features a device including: a semiconductor device including one or more logic units and a reporting unit coupled to each of the one or more logic units; and a controller coupled to the semiconductor device and configured to store status information of the one or more logic units in the semiconductor device. The reporting unit is coupled to the controller. Each of the one or more logic units is configured to send information associated with the logic unit through the reporting unit to the controller to indicate a status of the logic unit, and the controller is configured to, in response to receiving the information associated with the logic unit, update corresponding status information of the logic unit based on the status of the logic unit.

In some embodiments, the logic unit is configured to: send the information associated with the logic unit in response to determining a status change of the logic unit from a first status to a second status.

In some embodiments, the first status is a busy status, and the second status is a ready status.

In some embodiments, the logic unit is configured to: send the information associated with the logic unit without receiving a status query command from the controller.

In some embodiments, the logic unit is configured to: send the information associated with the logic unit in response to receiving a status query command from the controller.

In some embodiments, the information associated with the logic unit includes an identifier of the logic unit.

In some embodiments, the identifier includes a series of bits, and the logic unit is configured to send the identifier of the logic unit by sequentially sending the series of bits to the reporting unit.

In some embodiments, the one or more logic units include a first logic unit configured to: send information of the first logic unit through the reporting unit to the controller, in response to determining that there is a second logic unit sending information associated with the second logic unit to the reporting unit, stop sending the information associated with the first logic unit to the reporting unit, and in response to determining that there is no logic unit sending information to the reporting unit, resend the information of the first logic unit to the reporting unit.

In some embodiments, the reporting unit is coupled to the controller via a reporting pin, the information associated with the first logic unit includes a series of first bits, and the information associated with the second logic unit includes a series of second bits, and the first logic unit is configured to determine that there is the second logic unit sending the information associated with the second logic unit to the reporting unit by determining a value of a first bit in the series of first bits to be sent to the reporting pin is different from a bit value on the reporting pin that is same as a value of a second bit in the series of the second bits.

In some embodiments, a number of the series of first bits is identical to a number of the series of second bits, and an order of the first bit in the series of first bits is same as an order of the second bit in the series of second bits.

In some embodiments, the value of the first bit is "1", and the value of the second bit is "0."

In some embodiments, the semiconductor device includes a reporting pin coupled between the reporting unit and the controller. The reporting unit includes a comparator including: a first input coupled to the reporting pin, a second input coupled to the logic unit, and an output coupled to the logic unit.

The comparator is configured to output a comparing result between data on the first input from the reporting pin and data on the second input from the logic unit.

In some embodiments, the semiconductor device includes a reporting bus between the reporting pin and the reporting unit.

In some embodiments, the information of the logic unit includes a series of bits, and the logic unit is configured to send the information of the logic unit by sequentially sending the series of bits to the reporting pin through the reporting unit. The logic unit can be configured to: determine whether a value of a first bit in the series of bits sent to the reporting unit matches a value on the reporting pin based on the comparing result from the output of the comparator, in response to determining that the value of the first bit matches the value on the reporting pin, send a second bit sequential to the first bit in the series of bits to the reporting unit, and in response to determining that the value of the first bit is different from the value on the reporting pin, stop sending the series of bits.

In some embodiments, the reporting unit further includes a buffer having: a buffer input configured to receive the information of the logic unit from the logic unit, a trigger input configured to receive a trigger signal from the logic unit, and a buffer output configured to output the information of the logic unit when the trigger signal is on, and a transistor including a gate terminal coupled to the buffer output of the buffer, a first terminal coupled to the reporting pin, and a second terminal coupled to a ground.

In some embodiments, the logic unit is configured to enable or disable the buffer using the trigger signal to the trigger input of the buffer.

In some embodiments, the reporting unit further includes: a buffer coupled between the first terminal of the transistor and the first input of the comparator.

In some embodiments, the logic unit includes: a first node coupled to the buffer input and configured to provide the information of the logic unit to the buffer input, a second node coupled to the trigger input of the buffer and configured to provide the trigger signal to the trigger input, and a third node coupled to the output of the comparator and configured to receive the comparing result from the output of the comparator of the reporting unit. The logic unit is configured to determine whether there is another logic unit sending conflict information to the reporting pin based on the comparing result.

In some embodiments, the trigger signal is at a high level when the logic unit is in a ready status and at a low level when the logic unit is in a busy status.

In some embodiments, the reporting pin is a ready/busy (R/B #) pin shared by the one or more logic units in the semiconductor device.

In some embodiments, the reporting pin is an additional pin different from a ready/busy (R/B #) pin shared by the one or more logic units in the semiconductor device.

In some embodiments, the semiconductor device includes a reporting clock pin coupled between the reporting unit and the controller, and the controller is configured to provide a reporting clock signal via the reporting clock pin to each of the one or more logic units.

In some embodiments, the logic unit is configured to send the information of the logic unit at a frequency of the reporting clock signal.

In some embodiments, the logic unit is configured to send the information of the logic unit at a falling edge of the reporting clock signal, and the controller is configured to update the corresponding status information of the logic unit at the falling edge of the reporting clock signal after completely receiving the information of the logic unit.

In some embodiments, the controller is configured to: change a status of a logic unit from a busy status to a ready status at a falling edge of the reporting clock signal, and change a status of a logic unit from the ready status to the busy status at a rising edge of the reporting clock signal.

In some embodiments, the controller is configured to: send a synchronization signal to each of the one or more logic units through the reporting unit according to a predetermined protocol, and a first logic unit of the one or more logic units is configured to: in response to determining that the first logic unit is in a ready status, receive the synchronization signal, and send information of the first logic unit based on a frequency of the synchronization signal to the controller via a reporting pin coupled between the reporting unit and the controller.

In some embodiments, a second logic unit of the one or more logic units is configured to: in response to determining that the second logic unit is in a ready status, receive the synchronization signal, and send information of the second logic unit based on the frequency of the synchronization signal to the controller via the reporting pin, in response to determining that there is the information of the first logic unit on the reporting pin, stop sending the information of the second logic unit, and in response to determining that there is no information of other logic units on the reporting pin, resend the information of the second logic unit to the controller via the reporting pin.

In some embodiments, the semiconductor device includes no reporting clock pin coupled between the reporting unit and the controller.

In some embodiments, the controller is configured to periodically send a start-of-frame (SOF) packet to the one or more logic units through a reporting pin, and the logic unit is configured to send the information of the logic unit at a frequency of the SOF packet to the reporting pin.

In some embodiments, each of the one or more logic units is configured to communicate with the controller according to an asynchronous protocol, and the logic unit is configured to send the information associated with the logic unit between a starting bit and an ending bit to the controller at a predefined baud rate.

In some embodiments, the controller includes a logic unit status register storing one or more bits, each of the one or more bits having a respective value indicating a status of a corresponding logic unit of the one or more logic units.

In some embodiments, a value "1" indicates a ready status, and "0" indicates a busy status.

In some embodiments, the controller is configured to: determine that a first logic unit is in a ready status based on a value of a first bit corresponding to the first logic unit in the logic unit status register, send an operation command to the first logic unit, and in response to sending the operation command to the first logic unit, change the value of the first bit to indicate that the first logic unit is in a busy status.

In some embodiments, the first logic unit is configured to: in response to completing an operation corresponding to the operation command, send information associated with the first logic unit through the reporting unit to the controller to indicate that the first logic unit is in the ready status. The controller is configured to: in response to receiving the information associated with the first logic unit, change the value of the first bit in the logic unit status register to indicate that the first logic unit is in the ready status.

Another aspect of the present disclosure features a semiconductor device including: one or more logic units; a reporting unit coupled to the one or more logic units and a controller; and an interface coupled to the one or more logic units, the reporting unit, and the controller. The interface includes: one or more unit select pins each coupled to a respective logic unit and configured to select a respective logic unit based on a select signal from the controller; a data pin coupled to the one or more logic units and configured to transfer data between the one or more logic units and the controller; and a reporting pin coupled between the reporting unit and the controller. Each of the one or more logic units is configured to: in response to determining a status change of the logic unit, send information associated with the logic unit through the reporting unit and the reporting pin to the controller to indicate a current status of the logic unit.

Another aspect of the present disclosure features a device including: a memory including one or more memory units, each of the one or more memory units including one or more logic units and a corresponding reporting unit coupled to each of the one or more logic units; and a controller coupled to the memory and configured to store status information of the one or more logic units in each of the one or more memory units. The corresponding reporting unit in each of the one or more memory chips is coupled to the controller. Each of the one or more logic units is configured to: in response to determining a status change of the logic unit, send information associated with the logic unit through a corresponding reporting unit to the controller to indicate a current status of the logic unit. The controller is configured to: in response to receiving the information associated with the logic unit, update corresponding status information of the logic unit based on the current status of the logic unit.

Another aspect of the present disclosure features a method of managing status information of logic units, the method including: in response to determining a status change of a first logic unit, sending information associated with the first logic unit through a reporting unit to a controller to indicate a current status of the first logic unit by the first logic unit; in response to determining that there is a second logic unit sending information associated with the second logic unit to the reporting unit, stopping sending the information associated with the first logic unit to the reporting unit; in response to determining that there is no other logic unit sending information to the reporting unit, resending the information of the first logic unit through the reporting unit to the controller by the first logic unit; and updating status information for the first logic unit based on the information of the first logic unit by the controller.

Another aspect of the present disclosure features a semiconductor device including: one or more logic units and a reporting bus. Each of the one or more logic units is configured to send out information associated with the logic unit using a corresponding reporting unit through the reporting bus to indicate a status of the logic unit, and the information associated with the logic unit includes an identifier of the logic unit.

In some embodiments, each of the one or more logic units includes the corresponding reporting unit that is individually coupled to the reporting bus.

In some embodiments, the corresponding reporting unit is externally coupled to each of the one or more logic units, and coupled between the one or more logic units and the reporting bus.

In some embodiments, each of the one or more logic units is configured to: send the information associated with the logic unit in response to determining a status change of the logic unit from a first status to a second status, without receiving a status query command.

In some embodiments, each of the one or more logic units is configured to: proactively send out the information associated with the logic unit, without receiving a status query command.

In some embodiments, the one or more logic units include a logic unit configured to: in response to determining that there is no other logic unit sending information to the reporting bus, send out information of the logic unit through the reporting bus, and in response to determining that a bit value on the reporting bus is different from a bit sent by the logic unit, stop sending the information associated with the logic unit to the reporting bus, and in response to determining that there is no other logic unit sending information to the reporting bus, resend the information of the logic unit to the reporting bus.

In some embodiments, the corresponding reporting unit includes a comparator including: a first input configured to receive first data on the reporting bus, a second input configured to receive second data from the logic unit, the second data being sent to the reporting bus, and an output coupled to a control logic of the logic unit. The comparator is configured to output a comparing result between the first data received by the first input from the reporting bus and the second data received by the second input from the logic unit.

In some embodiments, the information of the logic unit includes a series of bits, and the logic unit is configured to send the information of the logic unit by sequentially sending the series of bits to the reporting bus through the corresponding reporting unit. The logic unit is configured to: determine whether a value on the reporting bus matches a value of a first bit in the series of bits sent to the reporting bus based on the comparing result from the output of the comparator, in response to determining that the value of the first bit matches the value on the reporting bus, send a second bit sequential to the first bit in the series of bits to the corresponding reporting unit, and in response to determining that the value of the first bit is different from the value on the reporting bus, stop sending the series of bits.

In some embodiments, the corresponding reporting unit further includes: a buffer having: a buffer input configured to receive the information of the logic unit from a first node of the control logic of the logic unit, a trigger input configured to receive a trigger signal from a second node of the control logic of the logic unit, and a buffer output configured to output data associated with the information of the logic unit when the trigger signal is on, and a transistor including a gate terminal coupled to the buffer output of the buffer, a first terminal coupled to the reporting bus, and a second terminal coupled to a ground. The output of the comparator is coupled to a third node of the control logic of the logic unit, and the control logic of the logic unit is configured to determine whether there is another logic unit sending conflict information to the reporting bus based on the comparing result received through the third node of the control logic.

In some embodiments, the transistor is an n-type transistor, and the semiconductor device further includes a pull-up unit coupled to a node between the first terminal of the transistor and the reporting bus, the pull-up unit being configured to pull up the reporting bus to a high level if none of the one or more logic units is busy.

In some embodiments, the semiconductor device further includes a reporting clock pin, and each of the one or more logic units is configured to receive a reporting clock signal via the reporting clock pin. The logic unit can be configured to send the information of the logic unit at a frequency of the reporting clock signal.

Another aspect of the present disclosure features a device, including: a semiconductor device including one or more logic units and a reporting bus; and a controller coupled to the semiconductor device and configured to store status information of the one or more logic units in the semiconductor device. Each of the one or more logic units is configured to send information associated with the logic unit using a corresponding reporting unit in the semiconductor device through the reporting bus to the controller to indicate a status of the logic unit, and the controller is configured to, in response to receiving the information associated with the logic unit, update corresponding status information of the logic unit based on the status of the logic unit.

In some embodiments, each of the one or more logic units is configured to: send the information associated with the logic unit in response to determining a status change of the logic unit from a first status to a second status, without receiving a status query command from the controller.

In some embodiments, the controller is configured to: send a synchronization signal to each of the one or more logic units through the corresponding reporting unit according to a predetermined protocol.

In some embodiments, the one or more logic units include a logic unit configured to: in response to determining that the logic unit is in a ready status, receive the synchronization signal from the controller, and send information of the logic unit based on a frequency of the synchronization signal to the controller through the reporting bus, in response to determining that there is no other logic unit sending information to the reporting bus, send out information of the logic unit through the reporting bus, in response to determining that there is information of another logic unit on the reporting bus, stop sending the information of the logic unit, and in response to determining that there is no information of other logic units on the reporting bus, resend the information of the logic unit to the controller via the reporting bus.

In some embodiments, the controller is configured to periodically send a start-of-frame (SOF) packet to the one or more logic units through the reporting bus, and the logic unit is configured to send the information of the logic unit at a frequency of the SOF packet to the reporting bus.

In some embodiments, each of the one or more logic units is configured to communicate with the controller according to an asynchronous protocol, and the logic unit is configured to send the information associated with the logic unit between a starting bit and an ending bit to the controller at a predefined baud rate.

In some embodiments, the controller includes a logic unit status register storing one or more bits, each of the one or more bits having a respective value indicating a status of a corresponding logic unit of the one or more logic units.

In some embodiments, the controller is configured to: determine that a first logic unit is in a ready status based on a value of a first bit corresponding to the first logic unit in the logic unit status register, send an operation command to the first logic unit, and in response to sending the operation command to the first logic unit, change the value of the first bit to indicate that the first logic unit is in a busy status.

In some embodiments, the semiconductor device further includes an interface coupled to the one or more logic units, the interface including: one or more unit select pins each coupled to a respective logic unit and configured to select a respective logic unit based on a select signal from a controller, and a data bus coupled to the one or more logic units and configured to transfer data between the one or more logic units and the controller.

Another aspect of the present disclosure features a device including: a memory including one or more memory units, each of the one or more memory units including: one or more logic units and a reporting bus coupled to the one or more logic units; and a controller coupled to the memory and configured to store status information of the one or more logic units in each of the one or more memory units. Each of the one or more logic units in each of the one or more memory units is configured to: in response to determining a status change of the logic unit in the memory unit, send information associated with the logic unit to the controller through the reporting bus in the memory unit to indicate a current status of the logic unit. The controller is configured to: in response to receiving the information associated with the logic unit, update corresponding status information of the logic unit based on the current status of the logic unit.

In some embodiments, each of the one or more logic units includes a respective reporting unit that is individually coupled to the reporting bus, and is configured to send the information associated with the logic unit through the respective reporting unit and the reporting bus to the controller.

In some embodiments, each of the one or more memory units further includes a reporting unit that is coupled to each of the one or more logic units and coupled between the one or more logic units and the reporting bus, and each of the one or more memory units is configured to send the information associated with the logic unit through the reporting unit and the reporting bus to the controller.

In some embodiments, each of the one or more logic units is configured to: send the information associated with the logic unit in response to determining a status change of the logic unit from a first status to a second status, without receiving a status query command from the controller.

The details of one or more disclosed implementations are set forth in the accompanying drawings and the description below. Other features, aspects, and advantages will become apparent from the description, the drawings and the claims.

DETAILED DESCRIPTION

Figure 1:
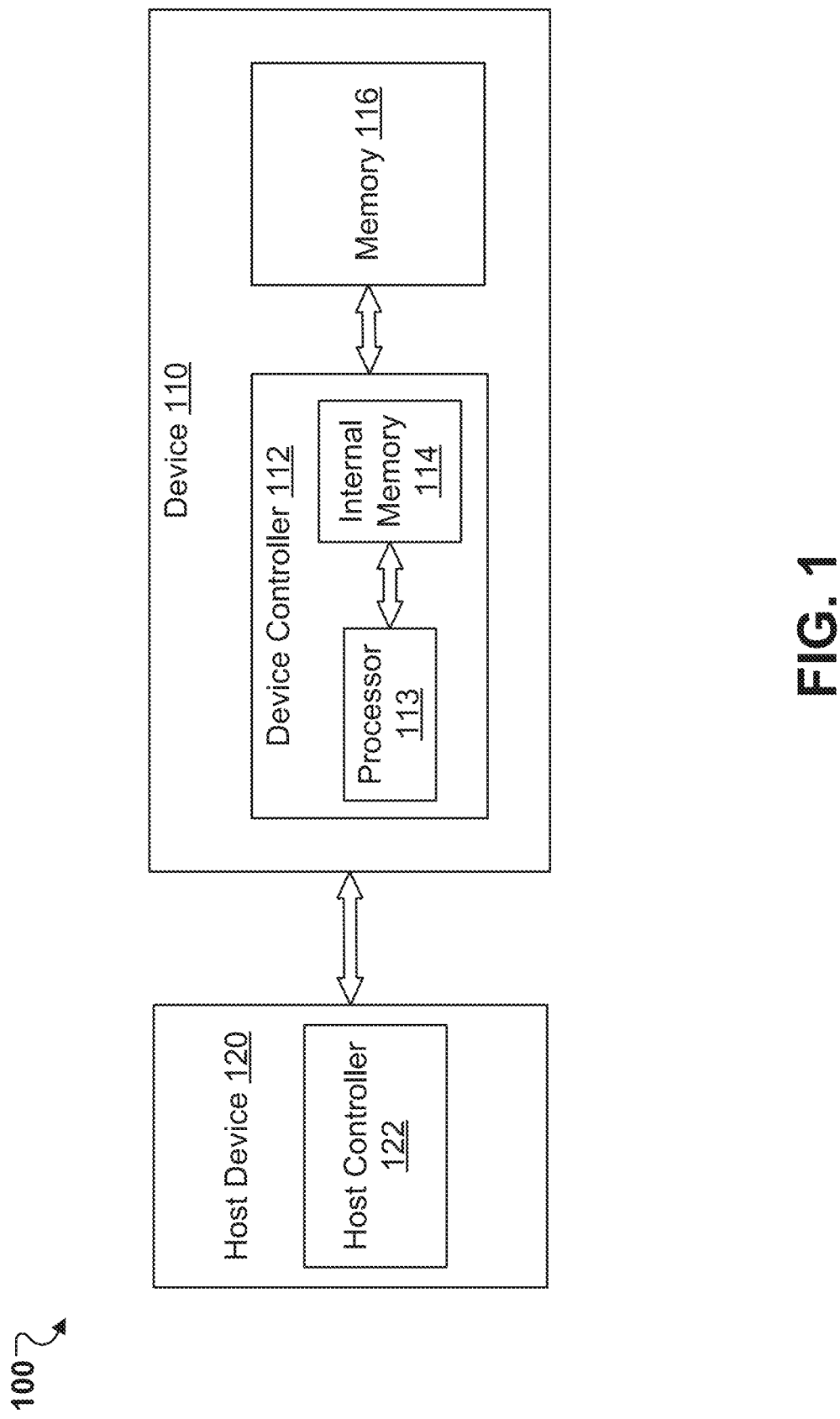
FIG. 1 illustrates an example of a system including a memory device, according to one or more embodiments of the present disclosure.

Multiple logic units, e.g., memory chips or dies such as NAND flash memory chips or dies, can be assembled together to form a high density memory device. However, the high-density memory device may have to spend a lot of time checking status information of each of the multiple logic units.

In some embodiments, a memory device includes multiple types of pins. A chip enable (CE) pin is a device selection control pin for each logic unit. A data pin (or bus) is shared for the logic units, and a memory controller can determine which logic unit occupies a data queue bus. A ready/busy (R/B #) pin indicates a status of a device. Ideally, to maximize the performance of the device, each logic unit can be accessed individually by a separated CE pin and a separated R/B #pin. However, cost and package limits restrict available pin counts on the memory device.

In some embodiments, two or more logic units share a common R/B #pin. However, all the logic units sharing the common R/B #pin may be considered in a busy state if any one of the logic units is busy. When the controller transmits a device command "read status" to the logic units to check which logic unit is accessible, each logic unit has to be queried regardless of the logic unit being busy or ready. This may cause a high overhead and limit parallelization to loss the device performance, especially for a high density memory device such as 3D NAND flash memory device.

Implements of the present disclosure provide methods, devices, systems, and techniques for managing status information of logic units in devices, which can reduce time and/or resource overheads due to status check by logic units proactively reporting (or self-initiating to report) their own status information (e.g., in response to a status change), thereby greatly improving the performance of the devices.

A device can include one or more chips. Each chip can include one or more dies within a package. Each die can function as a logic unit. In some embodiments, the one or more chips can be also assembled in a package. A controller can access one or more chips in the device. In some embodiments, the controller can include only one reporting bus connected to the one or more chips. In some embodiments, the controller can include multiple channels. Each channel can have its own data bus, control pin(s), and a dedicated reporting bus. Each channel can be coupled to at least one chip in the device. In some cases, the number of the reporting buses is the same as the number of the multiple channels. In some cases, the number of the reporting buses can be less than the number of the multiple channels, which can reduce overall signal numbers.

In some embodiments, a device includes multiple logic units and a reporting unit coupled to and shared by the multiple logic units. In some embodiments, a device includes multiple logic units each including a respective reporting unit. A reporting unit can be coupled to a controller using a reporting bus. The reporting bus can include one or more pins, e.g., an R/B #pin or an ACK pin. In some cases, the reporting bus includes a new pin additional to the R/B #pin. The R/B #pin or ACK pin can be used as a reporting pin.

Through a reporting bus, each logic unit itself can report its status to the controller without receiving a query command, which can greatly reduce time and resource overloads to improve the performance of the device. The reporting bus can indicate whether all logic units are ready or busy. For example, if all the logic units are ready or none of the logic units is busy, the reporting bus can be kept high (e.g., an idle state). If any one of the logic units is busy, the reporting bus can be kept low (e.g., an active state) until all the logic units return to a ready status. In some cases, a state of the reporting bus (or pin) can be represented or indicated by a bit or a series of bits. Note that the terms "status" and "state" can be used interchangeably herein.

The device can be configured to manage a reporting sequence between two or more logic units, e.g., sequentially through the reporting bus. The reporting bus can be a bidirectional open-drain reporting bus. A logic unit can return its own identifier to the controller when the logic unit returns to a ready status. The identifier of the logic unit can be a unique identifier for the logic unit (e.g., by a manufacture of the logic unit) or a specific identifier defined for the logic unit (e.g., by a controller, a memory, or a logic unit itself) in a form of a fixed length of bits. The logic unit can be configured to compare a bit in the identifier to be sent out with a bit on the reporting bus to determine whether there is conflicting reporting. Each logic unit is monitoring its output on the reporting bus when it is reporting. When two logic units have a conflict in reporting using the reporting bus, each logic unit is detecting whether its output matches actual data on the reporting bus. If a logic unit detects inconsistency or mismatch between its output and the actual data on the reporting bus, the logic unit can stop reporting; if the logic unit detects consistency or match between its output and the actual data on the reporting bus, the logic unit keeps reporting until completion. Once the logic unit completes the reporting, the logic unit returns to an idle state. Another logic unit can start its reporting using the reporting bus when it detects a match between its output and the actual data on the reporting bus.

In some embodiments, the reporting bus includes a reporting clock pin additional to the reporting pin. The controller can send a clock signal on the reporting clock pin as a reference clock for the reporting bus. The reporting clock pin can be necessary, optional, or unnecessary depending on a reporting protocol. In some cases, the reporting protocol can be a synchronous protocol with a clock signal or information. Its information (or content) transmission protocol (e.g., implemented as software or programming instructions) can be similar to serial peripheral interface (SPI), inter-integrated circuit (I2C), universal serial bus (USB), non-return to zero inverted (NRZI), Universal Synchronous Asynchronous Receiver Transmitter (USART). Synchronization in NRZI can be replaced with read-enable (REB) pin or write-enable (WEB) pin. In some cases, the reporting protocol can be an asynchronous reporting protocol. Its information (or content) transmission protocol (e.g., implemented as software or programming instructions) can be similar to Universal Asynchronous Receiver Transmitter (UART) with a fixed baud date, where the reporting clock pin is not needed When a logic unit returns to a ready status, the logic unit can report the ready status to the controller through a corresponding reporting unit and the reporting bus, e.g., by reporting information (such as an identifier) of the logic unit on the reporting bus. The controller can initiate a logic unit into a busy state by sending instructions/commands and then manage status information of the logic units. For example, once the controller receives the information of the logic unit, the controller can record (or update) the status of the logic unit in a logic unit status register that stores statuses of the multiple logic units. In some embodiments, the device includes multiple memory chips each including one or more logic units. The controller can include multiple logic unit status registers for the multiple memory chips, e.g., in an internal memory of the controller, and each logic unit status register stores status information of logic units in a corresponding memory chip. The controller can determine which logic unit can be accessed based on a corresponding logic unit status register, which enables the device to gain higher performance due to the reduction of the query time. In some embodiments, a logic unit status register is managed by software or programming instructions. The logic unit status register can be stored and managed in the controller. The logic unit status register can be also stored in the memory chip itself. The techniques described herein can also be backward compatible for "read status" command or R/B #pin. The controller can handle a status for each logic unit to reduce overhead, which can gain higher performance due to a reduction of query time.

The techniques can be applied to any semiconductor device including multiple units. The semiconductor device can be configured as described herein to manage status information of each of the multiple units. The techniques can be applied to various types of volatile memory devices or non-volatile memory (NVM) devices, such as NAND flash memory, NOR flash memory, resistive random-access memory (RRAM), phase-change memory (PCM) such as phase-change random-access memory (PCRAM), spin-transfer torque (STT)-Magnetoresistive random-access memory (MRAM), among others. The techniques can also be applied to charge-trapping based memory devices, e.g., silicon-oxide-nitride-oxide-silicon (SONOS) memory devices, and floating-gate based memory devices. The techniques can be applied to two-dimensional (2D) memory devices or three-dimensional (3D) memory devices. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices.

FIG. 1 illustrates an example of a system 100. The system 100 can include at least one device 110 and a host device 120. The device 110 includes a device controller 112 and a memory 116. The device controller 112 includes a processor 113 and an internal memory 114. In some implementations, the device 110 includes a plurality of memories 116 that are coupled to the device controller 112. The host device 120 includes a host controller 122 that can include at least one processor and at least one memory coupled to the at least one processor and storing programming instructions for execution by the at least one processor to perform one or more corresponding operations.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller.

The processor 113 accesses instructions and data from the internal memory 114. In some implementations, the internal memory 114 is a Static Random Access Memory (SRAM) or a Dynamic Random Access Memory (DRAM) or a combination thereof. For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1. The internal memory 114 stores instruction codes, which correspond to the instructions executed by the processor 113, and/or the data that are requested by the processor 113 during runtime.

The device controller 112 may transfer the instruction code and/or the data from the memory 116 to the internal memory 114 or to the host device 120. The memory 116 can be a semiconductor device. In some implementations, the memory 116 is a non-volatile memory that is configured for long-term storage of instructions and/or data, e.g., a NAND flash memory device, or some other suitable non-volatile memory device. In implementations where the memory 116 is NAND flash memory, the device 110 is a flash memory device, e.g., a flash memory card, and the device controller 112 is a NAND flash controller. For example, in some implementations, when the device 110 is an eMMC or an SD card, the memory 116 is a NAND flash.

The memory 116 includes a plurality of blocks. The memory 116 can be a two-dimensional (2D) memory including 2D memory blocks. The memory 116 can also be a three-dimensional (3D) memory including 3D memory blocks.

In some implementations, the memory 116 includes one or more memory units. Each memory unit can include one or more logic units. A memory unit can include a storage device or a memory chip. A logic unit, e.g., a logic unit number (LUN) device, can include a memory chip or memory die. Each logic unit can include a number of memory arrays and peripheral circuitry thereon. A memory array can include a number of planes, with each plane including a number of physical blocks of memory cells. Each physical block can include a number of pages of memory cells that can store a number of sectors of data. In the present disclosure herein, LUN is used as an example of a logic unit.

As discussed with further details below, the system 100 can be configured such that status information of the logic units in the memory 116 can be managed by the host controller 122, the device controller 112, and/or the memory 116, such that each logic unit can report its status change itself to replace a query command from the host controller 122 or the device controller 112. The host controller 122, the device controller 112, and/or the memory 116 can store status information of the logic units in the memory 116, which can reduce/eliminate query time and achieve high device performance.

Figure 2A:
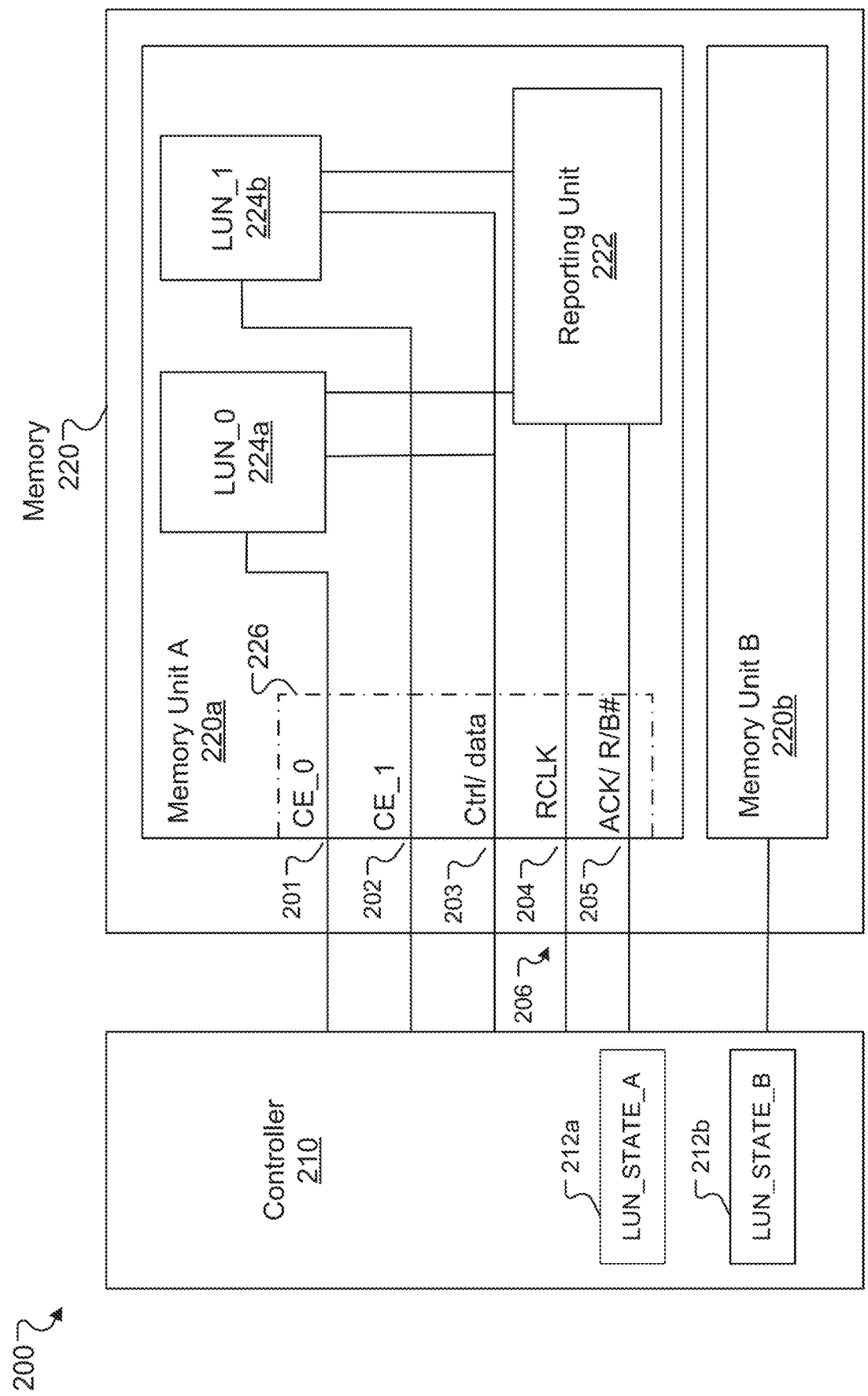
FIG. 2A illustrates an example of a device for managing status information of logic units in the device, according to one or more embodiments of the present disclosure.

FIG. 2A illustrates an example of a device 200 for managing status information of logic units in the device, according to one or more embodiments of the present disclosure. The device 200 can include a controller 210 (e.g., the device controller 112 or the host controller 122 of FIG. 1) and a memory 220 (e.g., the memory 116 of FIG. 1). The device 200 can be the device 110 of FIG. 1.

As illustrated in FIG. 2A, the memory 220 includes one or more memory units, e.g., memory unit A 220a, memory unit B 220b. Each memory unit can include one or more logic units (e.g., LUNs). Each memory unit can have a same or similar configuration or a different configuration. For illustration purposes only, the memory unit 220a is described as an example of a memory unit.

As illustrated in FIG. 2A, the memory unit 220a includes LUN_0 224a, LUN_1 224b. The memory unit 220a is coupled to the controller 210 through an interface 226 that can include one or more pins and/or buses. The controller 210 can have a corresponding interface including one or more pins and/or buses corresponding to the one or more pins and/or buses in the interface 226 of the memory unit 220a. In some embodiments, each logic unit 224a, 224b is coupled to the controller 210 via a respective chip enable (CE) pin CE_0 201, CE_1 202 through which the controller 210 can send a chip enable (or chip select) signal to enable the logic unit for operation. The interface 226 can also include a control or data bus 203 through which the controller 210 can communicate with each of the logic units 224a, 224b, e.g., sending commands or data to the logic units or receiving data from the logic units. The control or data bus 203 can include multiple pins, e.g., 8 pins for data input/output. The control or data bus 203 can be shared among the logic units in the memory unit 220a.

In some embodiments, as illustrated in FIG. 2A, the memory unit 220a includes a reporting unit 222 coupled to the logic units 224a, 224b in the memory unit 220a. The interface 226 can include a reporting clock (RCLK) pin 204 through which the controller 210 can send a clock signal to the reporting unit 222 as a reference clock for synchronization. The reporting clock pin 204 can be additional to a system clock pin for providing a system clock signal for the memory 220.

The interface 226 can further include a reporting pin 205 through which the reporting unit 222 is coupled to the controller 210. The reporting clock pin 204 and the reporting pin 205 can function together as a reporting bus 206. An electrical connection can be coupled between the reporting pin 205 and the reporting unit 222. The reporting pin 205 can be also named as an acknowledgement (ACK) pin. In some embodiment, the reporting bus can only include with the ACK pin without a reporting clock signal (RCLK) with clock information embedded in the message/information or an asynchronous approach without clock information. The interface 226 can include an R/B #pin configured to indicate whether the memory unit 220a is ready or not. In some cases, as shown in FIG. 2A, the reporting pin 205 can be implemented using the R/B #pin. In some cases, the reporting pin 205 is an additional pin to the R/B #pin.

The reporting pin 205 can indicate whether all logic units are ready or busy. For example, if all the logic units are ready, the reporting pin 205 can be kept high (e.g., an idle state) corresponding to bit "1". If any one of the logic units is busy, the reporting pin 205 can be an active state not kept high. For each memory unit 220a, 220b, the controller 210 can include a logic unit status register 212a, 212b storing status information of logic units in the memory unit. In some embodiments, the register stores one or more bits, each bit having a respective value indicating a status of a corresponding logic unit, e.g., a value "1" indicates a ready status, and "0" indicates a busy status.

Figure 2B:
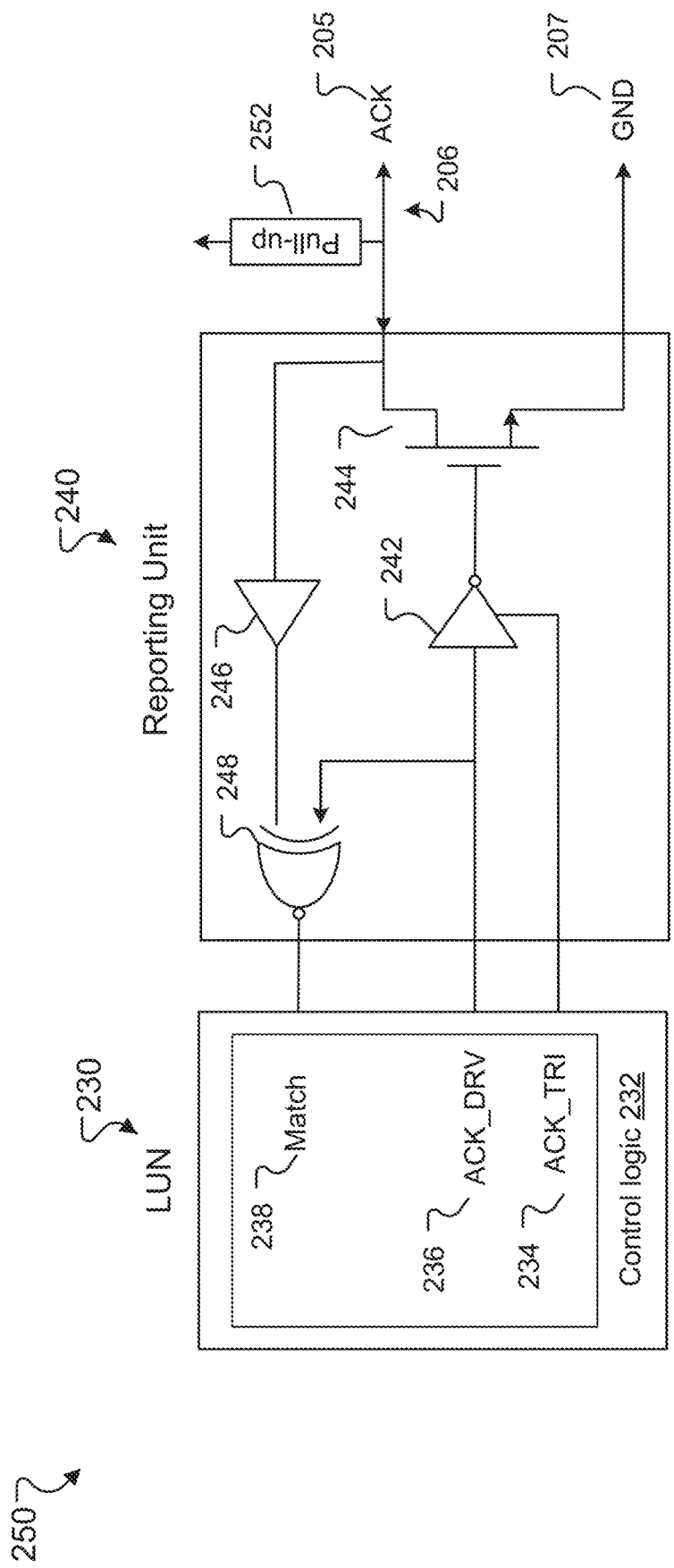
FIG. 2B illustrates an example of status reporting management with a logic unit and a reporting unit in a device, according to one or more embodiments of the present disclosure.

FIG. 2B illustrates an example device 250 (e.g., the memory unit 220a or 220b of FIG. 2A) for status reporting management with a logic unit 230 (e.g., the logic unit 224a or 224b of FIG. 2A) and a reporting unit 240 (e.g., the reporting unit 222 of FIG. 2A) in a device (e.g., the device 200 of FIG. 2A), according to one or more embodiments of the present disclosure. The reporting unit 240 is shared by two or more logic units including the logic unit 230 in the memory device.

As illustrated in FIG. 2B, the logic unit 230 can include a control logic 232. The control logic 232 includes a reporting trigger (or an acknowledgement trigger abbreviated as ACK_TRI) node 234, a reporting drive (or an acknowledgement drive abbreviated as ACK_DRV) node 236, and a matching result node 238. The reporting unit 240 can include a buffer 242 (e.g., a tri-state buffer), a transistor 244, a comparator 248, and optionally a buffer 246. In some embodiments, for each logic unit, the reporting unit 240 includes a corresponding buffer, a corresponding transistor, a corresponding comparator, and/or a corresponding buffer. The corresponding transistors for the logic units can be individually and independently coupled to the reporting bus 206. In some embodiments, as discussed with further details in FIGS. 2C-2D, each logic unit includes a respective reporting unit that is individually and independently coupled to a same reporting bus.

The buffer 242 includes a trigger input configured to receive a trigger signal from the logic unit 230 through the reporting trigger node 234, a buffer input configured to receive data (e.g., information of the logic unit 230 such as ID of the logic unit 230) from the logic unit 230 through the reporting drive node 236, and a buffer output configured to output the data when the trigger signal is on. The buffer 242 can be an inverted buffer. The buffer 242 can be a tri-state buffer that can be a logic inverter. When the trigger signal enables the buffer 242, the buffer 242 can invert an input bit.

The transistor 244 can be a metal-oxide-semiconductor (MOS) transistor. In some embodiments, as illustrated in FIG. 2B, the transistor 244 is an n-type MOS (NMOS) transistor. The transistor 244 includes a gate terminal coupled to the buffer output of the buffer 242, a first terminal (e.g., a drain terminal) coupled to the reporting pin 205, and a second terminal (e.g., a source terminal) coupled to a ground (GND) 207. A pull-up unit 252 can be coupled to a node between the transistor 244 and the reporting pin 205. The pull-up unit 252 is configured to pull up the reporting pin 205 to a high level, e.g., "1", if none of the logic units coupled to the reporting unit 240 is busy. The pull-up unit 252 can include a resistor. In some embodiments, the transistor 244 is a p-type MOS (PMOS) transistor, and a pull-down unit is coupled between the transistor 244 and the reporting pin 205, and configured to pull down the reporting pin 205 to a low level, e.g., "0", if none of the logic units coupled to the reporting unit 240 is busy. The pull-down unit can include a resistor.

In some embodiments, the logic unit 230 returns to a ready status and sends its identifier (ID) via the reporting drive node 236 to the buffer 242. The ID of the logic units can include one or more bits, e.g., "1" and/or "0". When a bit is "1", the buffer 242 outputs "0", and the transistor 244 is turned off and the value on the reporting pin 205 is pulled up to "1"; when a bit is "0", the buffer 242 outputs "1", and the transistor 244 is turned on and the value on the reporting pin 205 is "0". That is, the bit that the logic unit 230 is sending has the same value as the bit on the reporting pin 205 if the bit is successfully sent to the reporting pin 205.

The comparator 248 in the reporting unit 240 includes a first input coupled to the reporting pin 205 to receive a value on the reporting pin 205, a second input coupled to a buffer input of the buffer 242 to receive a value that the logic unit 230 is sending, and an output coupled to the matching result node 238 of the logic unit 230. A buffer 246 can be coupled between the first terminal of the transistor 244 and the first input of the comparator 248.

The comparator 248 is configured to compare data on the first input from the reporting pin 205 and data on the second input from the buffer input of the buffer 242 (e.g., the ID of the logic unit 230 to be sent) and output a comparing result to the logic unit 230 through the matching result node 238. The logic unit 230 can be configured to determine whether there is another logic unit sending information to the reporting pin based on the comparing result.

In some embodiments, the ID of the logic unit 230 includes a series of bits. The logic unit 230 determines whether a value of a first bit in the series of bits sent to the reporting unit 240 matches with a value on the reporting pin 205 based on the comparing result from the output of the comparator 248. If the value of the first bit matches the value on the reporting pin 205, the logic unit 230 receives a matching result which indicates that the first bit is successfully sent to the reporting pin 205. The logic unit 230 can then continue to send a second bit sequential to the first bit in the series of bits to the reporting unit 240. In contrast, if the value of the first bit mismatches the value on the reporting pin 205, the logic unit 230 receives a mismatching result which indicates that there is another logic unit sending a different bit on the reporting pin 205 and the first bit fails to be sent to the reporting pin 205. In response, the logic unit 230 can stop sending the series of bits and wait until another logic unit completes reporting.

For example, if the logic unit 230 is sending bit "1" to the reporting unit 240 before another logic unit sends bit "0" to the reporting unit 240, the value on the reporting pin 205 is "1" and the comparator 248 outputs a matching result; if the logic unit 230 is sending bit "1" to the reporting unit 240 after another logic unit sends bit "0" to the reporting unit 240, the value on the reporting pin 205 is "0" and the comparator 248 outputs a mismatching result. Similarly, if the logic unit 230 is sending bit "0" to the reporting unit 240 before another logic unit sends bit "1" to the reporting unit 240, the value on the reporting pin 205 is "0" and the comparator 248 outputs a matching result; if the logic unit 230 is sending bit "0" to the reporting unit 240 after another logic unit sends bit "1" to the reporting unit 240, the value on the reporting pin 205 is "1" and the comparator 248 outputs a mismatching result. In some cases, if the logic unit 230 is sending bit "0" to the reporting unit 240 and another logic unit sends bit "1" to the reporting unit 240 at the same time, the logic unit 230 receives a matching result and another logic unit 240 receives a mismatching unit, as the transistor 244 is turned on to make the reporting pin 205 have a low level "0", which is unaffected by the pull-up unit 252.

Figure 2C:
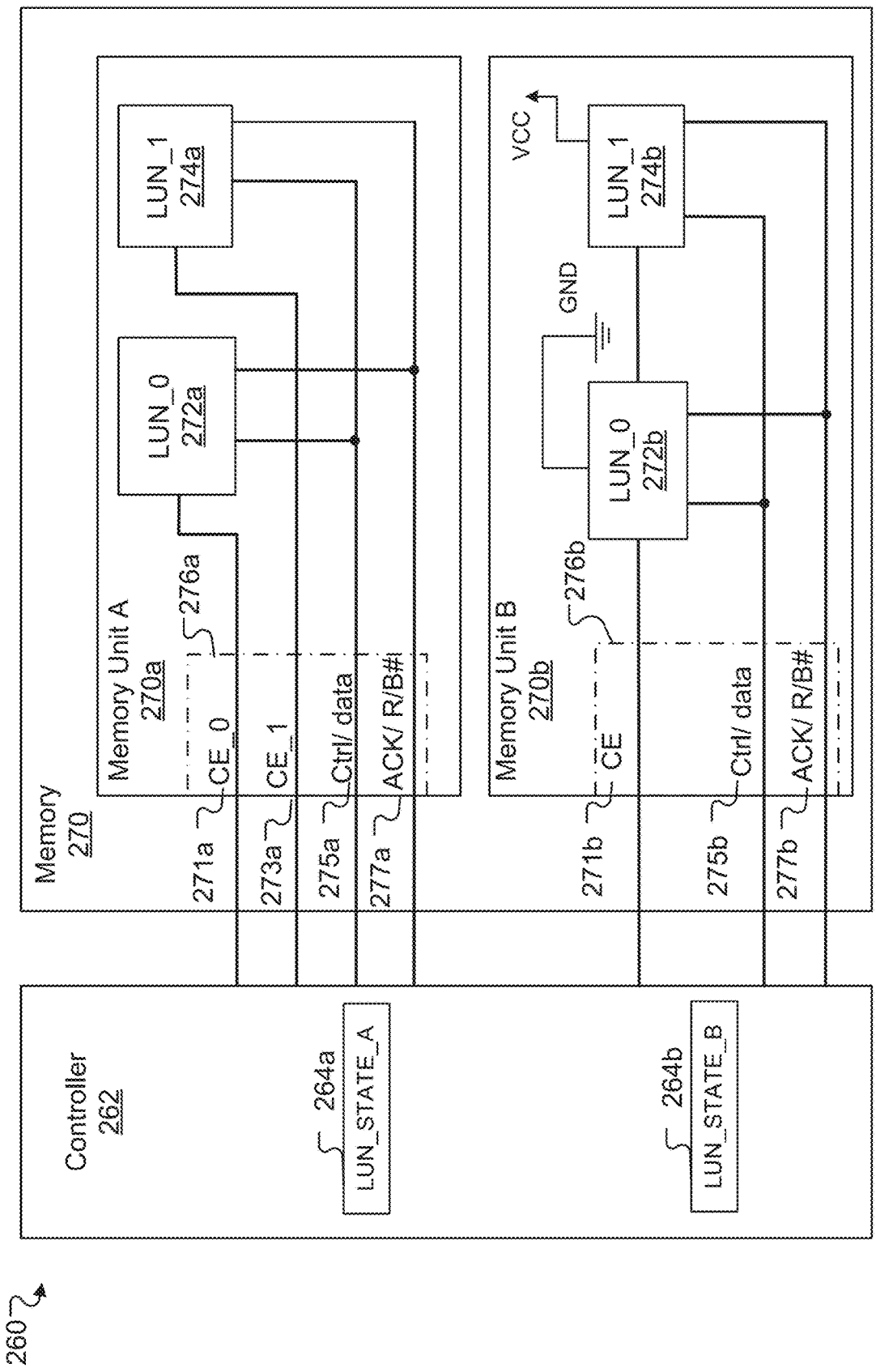
FIG. 2C illustrates another example of a device for managing status information of logic units in the device, according to one or more embodiments of the present disclosure.

FIG. 2C illustrates another example of a device 260 for managing status information of logic units in the device, according to one or more embodiments of the present disclosure. The device 260 can be the device 110 of FIG. 1. Similar to the device 200 of FIGS. 2A-2B, in some embodiments, the device 260 can include a controller 262 (e.g., the device controller 112 or the host controller 122 of FIG. 1) and at least one memory 270 (e.g., the memory 116 of FIG. 1). In some embodiments, the device 260 can include two or more controllers 262 and two or more memories 270. However, different from logic units in the device 200, as discussed with further details below, in the device 260, each logic unit in the memory 270 includes a respective reporting unit that is independently and individually coupled to a reporting bus to report its status information to the controller 262. The reporting bus can be shared by two or more logic units in a memory unit (as noted below). In some embodiments, the memory 270 includes one or more reporting buses for a plurality of logic units in a memory unit. The controller 262 can be similar to the controller 210 of FIG. 2A and configured to store status information of logic units in the memory 270.

As illustrated in FIG. 2C, the memory 270 includes one or more memory units, e.g., Memory Unit A 270a, Memory Unit B 270b. Each memory unit, e.g., 270a or 270b, includes one or more logic units. For example, the memory unit 270a includes LUN_0 272a and LUN_1 274a, and the memory unit 270b includes LUN_0 272b and LUN_1 274b in the memory unit 270b. For each memory unit 270a, 270b, the controller 262 can include a respective logic unit status register 264a, 264b storing status information of logic units in the memory unit. In some embodiments, the register stores one or more bits, each bit having a respective value indicating a status of a corresponding logic unit, e.g., a value "1" indicates a ready status, and "0" indicates a busy status.

The memory unit 270a is coupled to the controller 262 through an interface 276b that can include one or more pins and/or buses. In some embodiments, each logic unit 272a, 274a is coupled to the controller 262 via a respective chip enable (CE) pin CE_0 271a, CE_1 273a through which the controller 262 can send a chip enable (or chip select) signal to enable the logic unit for operation. The interface 276a can also include a control or data bus 275a through which the controller 262 can communicate with each of the logic units 272a, 274a, e.g., sending commands or data to the logic units or receiving data from the logic units. The control or data bus 275a can include multiple pins, e.g., 8 pins for data input/output. The control or data bus 275a can be shared among the logic units in the memory unit 270a.

In some embodiments, the interface 276a includes a reporting pin 277a through which the logic unit 272a, 274a is coupled to the controller 262. The reporting pin 277a can function as a reporting bus, e.g., the reporting bus 206 of FIGS. 2A-2B, with one or more additional pins such as a reporting clock pin. The reporting pin 277a can be an acknowledgement (ACK) pin or an R/B #pin, e.g., the ACK/R/B #pin 205 of FIGS. 2A-2B. In some cases, the reporting pin 277a is an additional pin to the R/B #pin.

The reporting pin 277a can indicate whether logic units 272a, 274a in the memory unit 270a are ready or busy. For example, if all the logic units are ready, the reporting pin 277a can be at an idle state. If any one of the logic units is busy, the reporting pin 277a can be at an active state. In some embodiments, a state of the reporting pin 277a can be represented or indicated by one or more bits.

In some embodiments, the memory unit 270b has a same configuration as the memory unit 270a, e.g., having same logic units and a same interface. In some embodiments, the memory unit 270b has a different configuration from the memory unit 270a. For example, as illustrated in FIG. 2C, an interface 276b of the memory unit 270 includes a common chip enable (CE) pin or bus 271b for logic units, e.g., LUN_0 272b, LUN_1 274b, in the memory unit 270b. Each logic unit in the memory unit 270b can be selected based on a protocol. For example, as illustrated in FIG. 2C, LUN_0 272b is coupled to a ground, which corresponds to an address "0", and LUN_1 274b is coupled to a voltage source VCC, which corresponds to an address "1". LUN_0 272b can be selected if the CE pin or bus 271b is asserted and a command (e.g., from the controller 262) includes an LUN address that is identical to 0. LUN_1 274b can be selected if the CE pin or bus 271b is asserted and the command includes an LUN address that is identical to 1.

Similar to the interface 276a in the memory unit 270a, the interface 276b in the memory unit 270b includes a control or data bus 275b that is similar to the control or data bus 275a. Through the control or data bus 275a, the controller 262 can communicate with each of the logic units 272b, 274b, e.g., sending commands or data to the logic units or receiving data from the logic units. The control or data bus 275b can include multiple pins, e.g., 8 pins for data input/output. The control or data bus 275b can be shared among the logic units in the memory unit 270b.

Similar to the interface 276a in the memory unit 270a, the interface 276b in the memory unit 270b can also include a reporting pin 277b through which the logic unit 272b, 274b is coupled to the controller 262. The reporting pin 277b can function as a reporting bus, e.g., the reporting bus 206 of FIGS. 2A-2B, with one or more additional pins such as a reporting clock pin. The reporting pin 277b can be an acknowledgement (ACK) pin or an R/B #pin, e.g., the ACK/ R/B #pin 205 of FIGS. 2A-2B. In some cases, the reporting pin 277b is an additional pin to the R/B #pin.

Figure 2D:
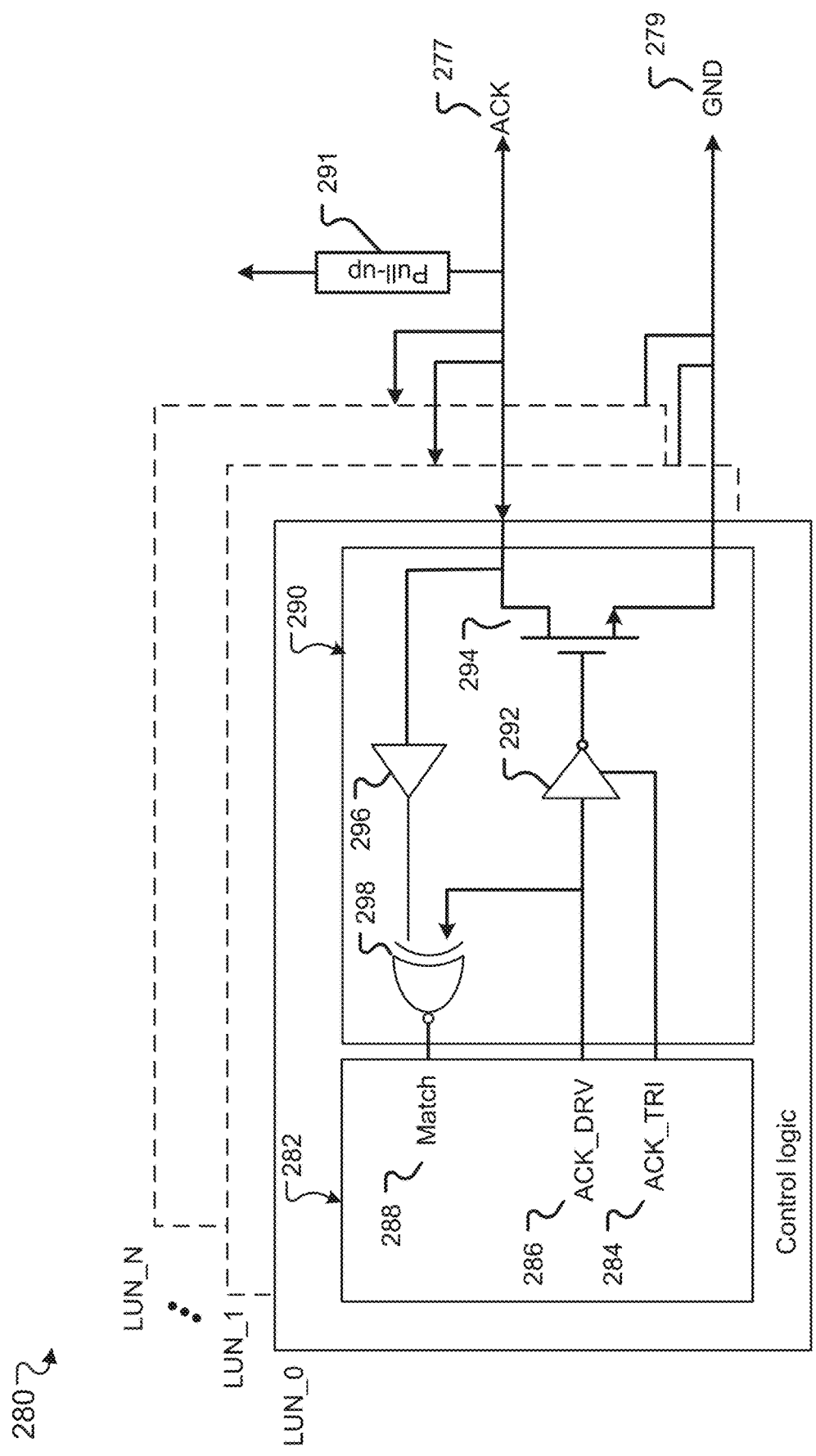
FIG. 2D illustrates another example of status reporting management for logic units in a device, according to one or more embodiments of the present disclosure.

As discussed with further details in FIG. 2D, each logic unit in the memory unit 270a or 270b includes a respective reporting unit that is individually and independently coupled to the reporting pin 277a or 277b and configured to report status information of the logic unit to the controller 262.

FIG. 2D illustrates another example of status reporting management for logic units in a device 280, according to one or more embodiments of the present disclosure. The device 280 can be the memory unit 270a or the memory unit 270b of FIG. 2C. The device 280 includes a number of logic units LUN_0, LUN_1, . . . , LUN_N, which can be LUN_0 272a, LUN_1 274a, LUN_0 272b, or LUN_1 274b. Each of the logic units is individually and separately coupled to a common reporting pin (or bus) ACK 277 (which can be the reporting pin 277a or 277b) and a common ground 279.

As illustrated in FIG. 2D, each logic unit includes a respective control logic 282 and a respective reporting unit 290. The control logic 282 can be similar to the control logic 232 of FIG. 2B. The reporting unit 290 can be similar to the reporting unit 240 of FIG. 2B. The control logic 282

As illustrated in FIG. 2D, the control logic 282 can include a reporting trigger (or an acknowledgement trigger abbreviated as ACK_TRI) node 284 (e.g., the reporting trigger node 234 of FIG. 2B), a reporting drive (or an acknowledgement drive abbreviated as ACK_DRV) node 286 (e.g., the ACK_DRV node 236 of FIG. 2B), and a matching result node 288 (e.g., the matching result node 238 of FIG. 2B). The reporting unit 290 can include a buffer 292 (e.g., the buffer 242 of FIG. 2B), a transistor 294 (e.g., the transistor 244 of FIG. 2B), a comparator 298 (e.g., the comparator 248 of FIG. 2B), and optionally a buffer 296 (e.g., the buffer 246 of FIG. 2B).

The buffer 292 includes a trigger input configured to receive a trigger signal from the control logic 282 through the reporting trigger node 284, a buffer input configured to receive data (e.g., information of the logic unit such as ID of the logic unit) from the control logic 282 through the reporting drive node 286, and a buffer output configured to output the data when the trigger signal is on. The buffer 292 can be an inverted buffer. The buffer 292 can be a tri-state buffer that can be a logic inverter. When the trigger signal enables the buffer 292, the buffer 292 can inverter an input bit.

The transistor 294 can be a metal-oxide-semiconductor (MOS) transistor. In some embodiments, as illustrated in FIG. 2D, the transistor 294 is an n-type MOS (NMOS) transistor. The transistor 294 includes a gate terminal coupled to the buffer output of the buffer 292, a first terminal (e.g., a drain terminal) coupled to the common reporting pin 277, and a second terminal (e.g., a source terminal) coupled to the common ground (GND) 279. A pull-up unit 291 (e.g., the pull-up unit 252 of FIG. 2B) is coupled to a node between the reporting pin 277 and the logic units. The pull-up unit 291 is configured to pull up the reporting pin 277 to a high level, e.g., "1", if none of the logic units coupled to the reporting unit 290 is busy. The pull-up unit 291 can include a resistor.

In some embodiments, the transistor 294 is a p-type MOS (PMOS) transistor, and a pull-down unit is coupled between the transistor 294 and the reporting pin 277, and configured to pull down the reporting pin 277 to a low level, e.g., "0", if none of the logic units coupled to the reporting unit 290 is busy.

The comparator 298 in the reporting unit 290 includes a first input coupled to the reporting pin 277 to receive a value on the reporting pin 277, a second input coupled to a buffer input of the buffer 292 to receive a value that the control logic 282 is sending, and an output coupled to the matching result node 288. The comparator 298 is configured to compare data on the first input from the reporting pin 277 and data on the second input from the buffer input of the buffer 292 and output a comparing result to the control logic 282 through the matching result node 288. The control logic 282 can be configured to determine whether there is another logic unit sending information to the reporting pin based on the comparing result.

In some embodiments, the ID of the logic unit includes a series of bits. The control logic 282 determines whether a value of a first bit in the series of bits sent to the reporting unit 290 matches with a value on the reporting pin 277 based on the comparing result from the output of the comparator 298. If the value of the first bit matches the value on the reporting pin 277, the control logic 282 receives a matching result which indicates that the first bit is successfully sent to the reporting pin 277. The control logic 282 can then continue to send a second bit sequential to the first bit in the series of bits to the reporting unit 290. In contrast, if the value of the first bit mismatches the value on the reporting pin 277, the control logic receives a mismatching result which indicates that there is another logic unit sending a different bit on the reporting pin 277 and the first bit fails to be sent to the reporting pin 277. In response, the control logic unit 282 can stop sending the series of bits and wait until another logic unit completes reporting.

For example, if a logic unit (e.g., LUN_0) is sending bit "1" to the reporting pin 277 while another logic unit (e.g., LUN_1) sends bit "1" to the reporting pin 277, the value on the reporting pin 277 is "1" and the comparator 298 in the logic unit outputs a matching result, and the logic unit can continue to send the series of bits. If the logic unit is sending bit "1" to the reporting pin 277 while another logic unit sends bit "0" to the reporting pin 277, the value on the reporting pin 277 is "0" and the comparator 298 in the logic unit outputs a mismatching result, and the logic unit can stop sending the series of bits.

Similarly, if the logic unit is sending bit "0" to the reporting pin 277 while another logic unit sends bit "1" to the reporting pin 277, the value on the reporting pin 277 is "0" and the comparator 298 outputs a matching result; if the logic unit is sending bit "0" to the reporting pin 277 while another logic unit sends bit "0" to the reporting pin 277, the value on the reporting pin 277 is "0" and the comparator 298 outputs a matching result.

In some cases, if the logic unit is sending bit "0" to the reporting pin 277 and another logic unit sends bit "1" to the reporting pin 277 at the same time, the logic unit receives a matching result and another logic unit receives a mismatching unit, as the transistor 294 is turned on to make the reporting pin 277 have a low level "0", which is unaffected by the pull-up unit 291.

As discussed with further details below, e.g., FIGS. 3 and 4, through a reporting bus (or pin), each logic unit itself can report its status to a controller without first receiving a query command. For example, when a logic unit returns to a ready status, the logic unit can report the ready status to the controller through the reporting bus, e.g., by reporting information (such as an identifier ID) of the logic unit on the reporting bus. Once the controller receives the information of the logic unit indicating that the logic unit is in a ready status, the controller can record (or update) the status of the logic unit in a corresponding logic unit status register that stores statuses of the logic units. The controller can determine which logic unit can be accessed based on the corresponding logic unit status register.

Figure 3:
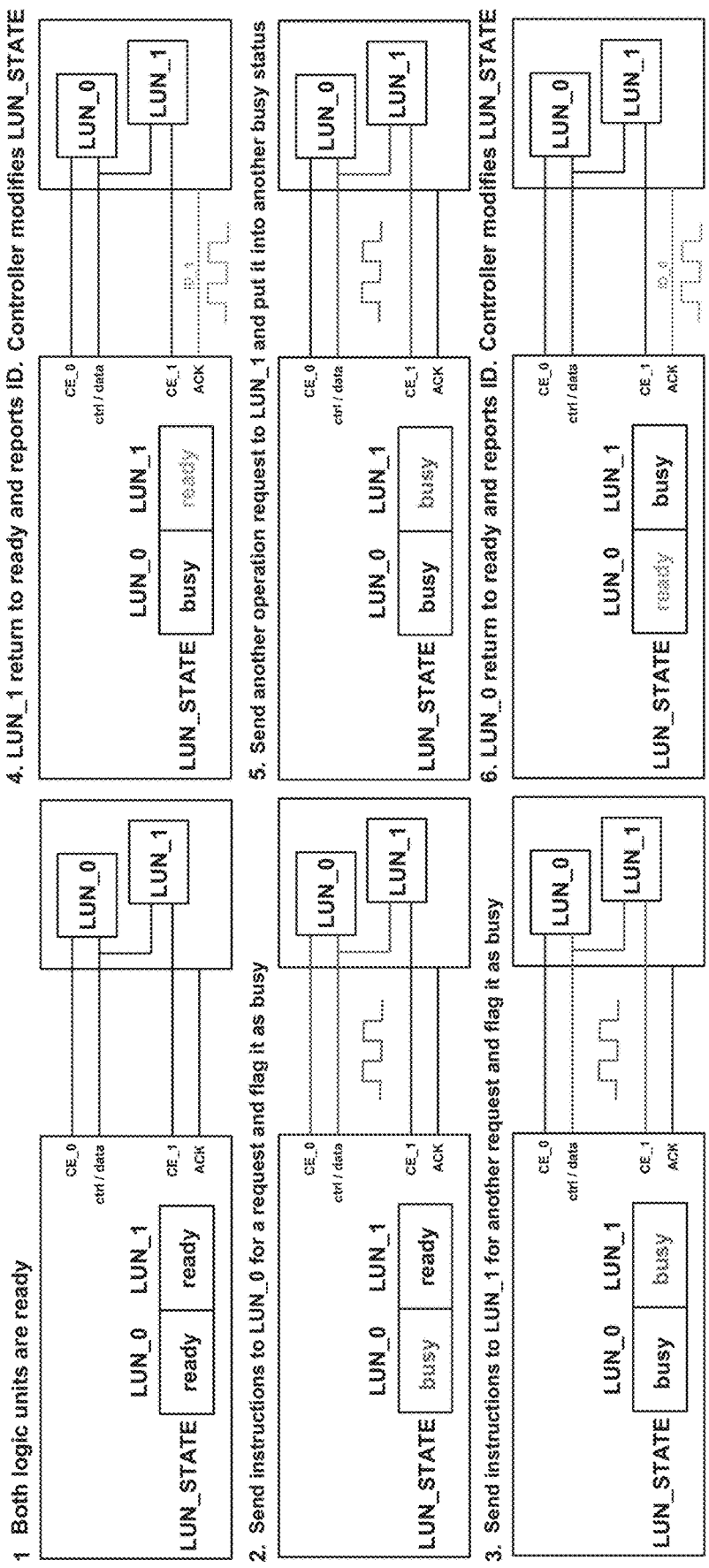
FIG. 3 illustrates an example of managing status information of logic units between a controller and logic units, according to one or more embodiments of the present disclosure.

FIG. 3 illustrates an example 300 of managing status information of logic units using a controller (e.g., the controller 210 of FIG. 2A or the controller 262 of FIG. 2C) and logic units (e.g., logic units 224a, 224b of FIG. 2A, the logic unit 230 of FIG. 2B, the logic units 272a, 274a, 272b, 274b of FIG. 2C, or the logic unit LUN_0, LUN_1, ..., or LUN_N of FIG. 2D) in a semiconductor device (e.g., memory 220 of FIG. 2A or memory 270 of FIG. 2C), according to one or more embodiments of the present disclosure.

As illustrated in FIG. 3, each logic unit LUN_0, LUN_1 is coupled to the controller using a respective chip enable pin CE_0, CE_1 (e.g., 201, 202 of FIG. 2A, 271a, 273a of FIG. 2C, or 271b of FIG. 2C) and a shared control/data pin (e.g., 203 of FIG. 2A, or 275a or 275b of FIG. 2C). In some embodiments, the semiconductor device includes a reporting unit (e.g., the reporting unit 222 of FIG. 2A or 240 of FIG. 2B) shared by the logic units LUN_0, LUN_1 and coupled to the controller via a reporting pin (or an ACK pin) (e.g., 205 of FIG. 2A). In some embodiments, each logic unit LUN_0, LUN_1 includes a respective reporting unit (e.g., the reporting unit 290 of FIG. 2D) that is individually coupled to a common reporting bus (or pin) (e.g., 277a or 277b of FIG. 2C or 277 of FIG. 2D). The controller includes a logic unit status register LUN STATE (e.g., 212a or 212b of FIG. 2A, or 264a or 264b of FIG. 2C) storing statues of the logic units LUN_0, LUN_1.

At stage (1) (e.g., an initial stage), both logic units are ready, and the controller stores a ready status for each of the logic units in the logic unit status register, e.g., "ready" for LUN_0 and "ready" for LUN_1.

At stage (2), in response to determining that LUN_0 is in the ready status by checking the logic unit status register, the controller sends a chip enable signal to LUN_0 through the CE_0 pin and a command (or request) to LUN_0 through the control/data pin. Accordingly, as LUN_0 becomes busy due to the command from the controller, and the controller updates the status of LUN_0 to "busy" in the logic unit status register once the command has been committed to LUN_0.

At stage (3), similarly, in response to determining that LUN_1 is in the ready status by checking the logic unit status register, the controller sends a chip enable signal to LUN_1 through the CE_1 pin and a command (or request) to LUN_1 through the control/data pin. Accordingly, as LUN_1 becomes busy due to the command from the controller, and the controller updates the status of LUN_1 to "busy" in the logic unit status register.

At stage (4), LUN_1 returns to the ready status and reports its ID to the controller through the reporting pin (or ACK pin) to indicate that LUN_1 is back to the ready status. In response to receiving the ID of the LUN_1, the controller modifies the status of LUN_1 to "ready" in the logic unit status register.

At stage (5), in response to determining that LUN_1 is again in the ready status by checking the logic unit status register, the controller sends a chip enable signal to LUN_1 through the CE_1 pin and a command to LUN_1 through the control/data pin. Accordingly, as LUN_1 becomes busy due to the command from the controller, and the controller updates the status of LUN_1 to another "busy" in the logic unit status register.

At stage (6), LUN_0 returns to the ready status and reports its ID to the controller through the reporting pin (or ACK pin) to indicate that LUN_0 is back to the ready status. In response to receiving the ID of the LUN_0, the controller modifies the status of LUN_0 to "ready" in the logic unit status register.

Figure 4:
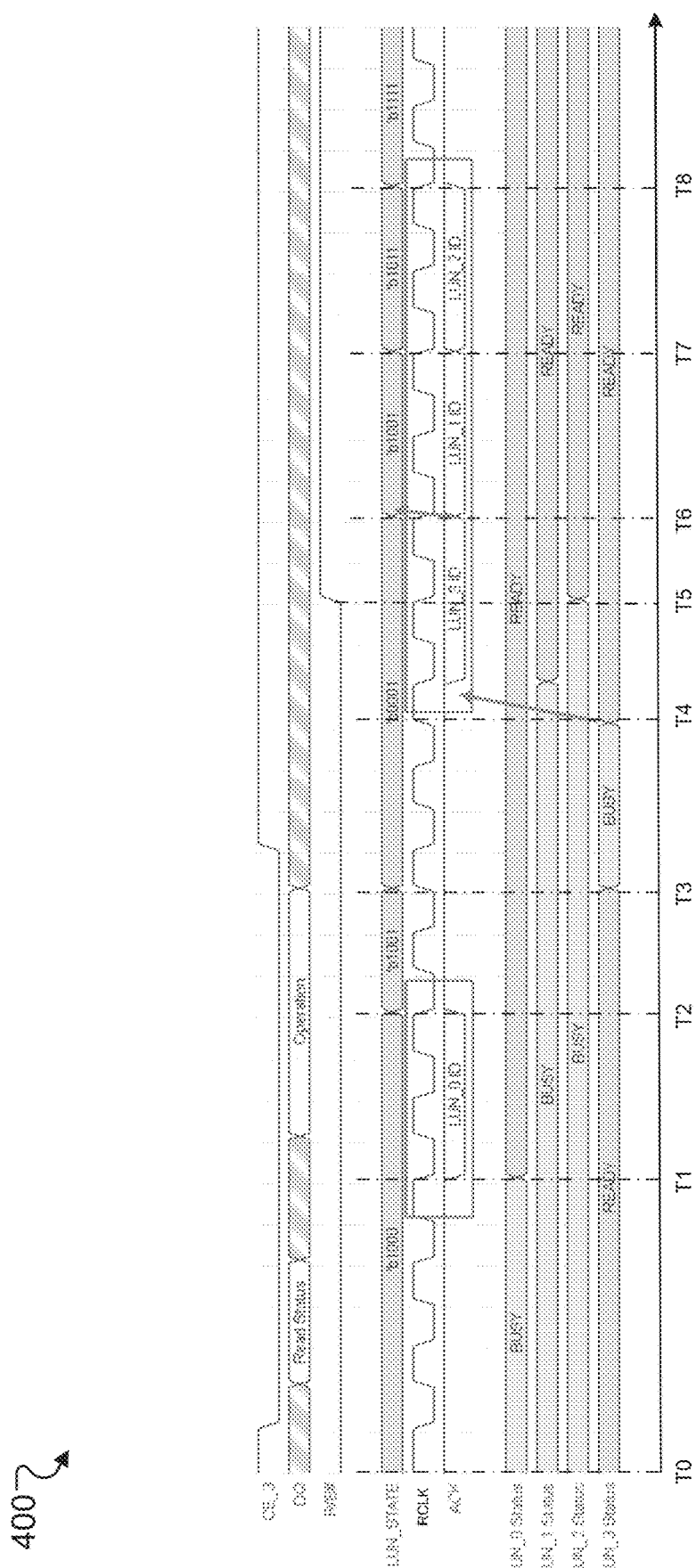
FIG. 4 illustrates a timing diagram showing changes of status information of logic units, according to one or more embodiments of the present disclosure.

FIG. 4 illustrates a timing diagram 400 showing changes of status information of logic units in a device, according to one or more embodiments of the present disclosure. The timing diagram 400 shows an example of implementation of status management in the device.

The device can be the device 200 of FIG. 2A or the device 260 of FIG. 2C. The device includes four logic units LUN_0, LUN_1, LUN_2, LUN_3 in a memory (e.g., the memory unit 220a, 220b of FIG. 2A, 270a, 270b of FIG. 2C) and a controller (e.g., the controller 210 of FIG. 2A or the controller 262 of FIG. 2C) configured to store status information of the four logic units in a logic unit status register LUN STATE (e.g., 212a or 212b of FIG. 2A, or 264a or 264b of FIG. 2C). A logic unit in the device can be logic unit 224a, 224b of FIG. 2A, the logic unit 230 of FIG. 2B, the logic units 272a, 274a, 272b, 274b of FIG. 2C, or the logic unit LUN_0, LUN_1, ..., or LUN_N of FIG. 2D.

In some embodiments, the device includes a reporting unit (e.g., 222 of FIG. 2A or 240 of FIG. 2B) shared by the four logic units and coupled to the controller through a reporting pin (or ACK pin) (e.g., 205 of FIG. 2A or 2B) and a reporting clock pin (e.g., 204 of FIG. 2A). The reporting pin and the reporting clock pin can function as a reporting bus (e.g., the reporting bus 206 of FIGS. 2A-2B). The controller can send a reporting clock signal through the reporting clock pin to the memory as a reference clock signal for reporting.

In some embodiments, each logic unit in the device includes a respective reporting unit (e.g., the reporting unit 290 of FIG. 2D) that is individually coupled to a common reporting bus (or pin) (e.g., 277a or 277b of FIG. 2C or 277 of FIG. 2D). In some embodiments, the device includes a first reporting unit shared by two or more logic units, and the remaining logic unit(s) has a respective reporting unit.

At time T0, logic units LUN_0, LUN_1, LUN_2 are all in a busy status, while logic unit LUN_3 is in a ready status. The logic unit status register stores bits "1000" for the four logic units LUN_3, LUN_2, LUN_1, LUN_0, respectively, where "1" represents the ready status and "0" represents the busy status.

By checking the logic unit status register, the controller can determine that logic unit LUN_3 is ready and can be accessed. In some cases, the controller can send a command "Operation" through a data pin (e.g., 203 of FIG. 2A or 275a or 275b of FIG. 2C) to logic unit LUN_3.

At time T1, logic unit LUN_0 returns to the ready status and reports its status change by sending its ID (LUN_0 ID), e.g., at a falling edge of the reporting clock signal, through the ACK pin to the controller. Once the controller receives the LUN_0 ID of logic unit LUN_0, the controller updates the status of logic unit LUN_0 to the ready status by modifying the logic unit status register from "1000" to "1001" at time T2, e.g., at a falling edge of the reporting clock signal.

At time T3, after the controller sends out the command to logic unit LUN_3 through the data pin, the controller changes the status of logic unit LUN_3 to the busy status by updating the logic unit status register from "1001" to "0001", e.g., at a rising edge of the reporting clock signal. The controller can change a status of a logic unit from "BUSY" to "READY" at a falling edge of the reporting clock signal and from "READY" to "BUSY" at a rising edge of the reporting clock signal, or vice versa. After changing the status of logic unit LUN_3 to "BUSY", the controller can then send a chip enable signal through a corresponding CE3 pin (e.g., 201 or 202 of FIG. 2A) to enable logic unit LUN_3 for operation.

At time T4, logic unit LUN_3 completes the operation and returns to the ready status, which is before two other logic units LUN_1 and LUN_2 both return to the ready status at time T5. The device includes an R/B #pin that is changed at time T5 from a low signal (indicating there is at least one logic unit is busy) to a high signal indicating all the logic units are ready.

At time T4, logic unit LUN_3 first reports its status change by sending its ID (LUN_3 ID), e.g., at a rising edge of the reporting clock signal, through the ACK pin to the controller. Once the controller receives the LUN_3 ID of logic unit LUN_3, the controller updates the status of logic unit LUN_3 to the ready status by modifying the logic unit status register from "0001" to "1001" at time T6, e.g., at a falling edge of the reporting clock signal.

Figure 5:
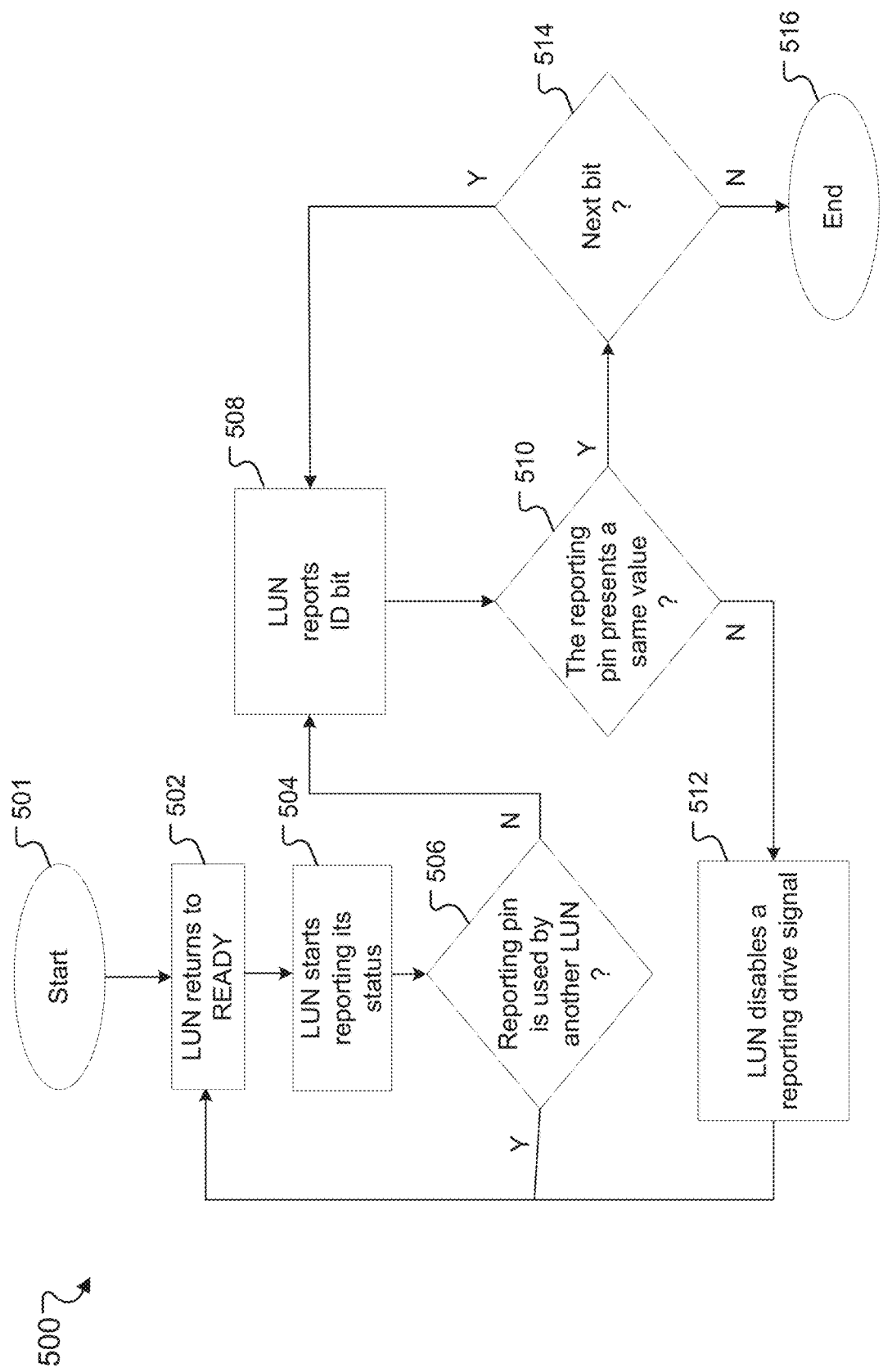
FIG. 5 is a flow chart showing an example of a process for managing status information of logic units in a device, according to one or more embodiments of the present disclosure.

Logic unit LUN_1 returns to the ready status earlier than logic unit LUN_2, thus, logic unit LUN_1 can report its ID through the reporting pin before the logic unit LUN_2, as discussed in FIGS. 2B, 2D and 5. At time T6, once logic unit LUN_3 completes reporting its ID through the reporting pin (or ACK pin), logic unit LUN_1 reports its ID LUN_1 ID through the reporting pin to the controller, e.g., at a falling edge of the reporting clock signal. Once the controller receives the LUN_1 ID of logic unit LUN_1, the controller updates the status of logic unit LUN_1 to the ready status by modifying the logic unit status register from "1001" to "1011" at time T7, e.g., at a falling edge of the reporting clock signal.

At time T7, once logic unit LUN_2 completes reporting its ID through the reporting pin, logic unit LUN_2 reports its ID LUN_2 ID through the reporting pin to the controller, e.g., at a falling edge of the reporting clock signal. Once the controller receives the LUN_2 ID of logic unit LUN_2, the controller updates the status of logic unit LUN_2 to the ready status by modifying the logic unit status register from "1011" to "1111" at time T8.

In some embodiments, the device can be also configured to manage a reporting sequence between two or more logic units, e.g., sequentially through the reporting pin to the controller. For example, when two logic units have a conflict in reporting using the reporting bus or pin, the device can be configured to allow a first logic unit to continue reporting and stop the reporting of a second logic unit. Once the first logic unit completes the reporting, the second logic unit can restart its reporting using the reporting bus or pin.

FIG. 5 is a flow chart showing an example of a process 500 for managing status information of logic units in a device, according to one or more embodiments of the present disclosure. The process 500 can be used to manage conflicting reporting among the logic units in the device. The process 500 can be performed by a logic unit of the logic units in the device. The device can be the device 110 of FIG. 1, the device 200 of FIG. 2A, or the device 260 of FIG. 2C. The device can also be the memory 116 of FIG. 1, the memory 220 of FIG. 2A, or the memory 270 of FIG. 2C. The device can also be the memory unit 220a, 220b of FIG. 2A, the device 250 of FIG. 2B, the memory unit 270a, 270b of FIG. 2C, or the device 280 of FIG. 2D. The logic unit can be 224a, 224b of FIG. 2A or 230 of FIG. 2B, the logic unit 272a, 274a, 272b, 274b of FIG. 2C, or the logic unit LUN_0, LUN_1, . . . , or LUN_N of FIG. 2D.

In some embodiments, the device includes a reporting unit (e.g., 222 of FIG. 2A or 240 of FIG. 2B) shared by logic units in the device and coupled to a controller (e.g., the host controller 122 or the device controller 112 of FIG. 1, the controller 210 of FIG. 2A, or the controller 262 of FIG. 2C) through a reporting pin (or ACK pin) (e.g., 205 of FIG. 2A or 2B) and a reporting clock pin (e.g., 204 of FIG. 2A). The reporting pin and the reporting clock pin can function as a reporting bus (e.g., the reporting bus 206 of FIGS. 2A-2B). The controller can send a reporting clock signal through the reporting clock pin to the memory as a reference clock signal for reporting.

In some embodiments, each logic unit in the device includes a respective reporting unit (e.g., the reporting unit 290 of FIG. 2D) that is individually coupled to a common reporting bus (or pin) (e.g., 277a or 277b of FIG. 2C or 277 of FIG. 2D). In some embodiments, the device includes a first reporting unit shared by two or more logic units, and the remaining logic unit(s) has a respective reporting unit.

The process starts (501), e.g., when the logic unit is turned on or when the logic unit finishes an operation. The logic unit returns to a ready status (502), e.g., after the logic unit is turned on and receives no command from the controller or just finishes the operation. The logic unit starts reporting its status (504), e.g., by sending information of the logic unit such as an identifier (ID) of the logic unit to the controller.

The logic unit then determines whether the reporting pin is used by another logic unit (506). For example, the logic unit can determine whether the reporting pin is used by another logic unit based on checking a signal level on the reporting pin. If the signal level on the reporting pin is kept high, the logic unit can determine there is no other logic unit using the reporting pin. If the signal level on the reporting pin is not kept high, e.g., low or alternative between a high level and a low level, the logic unit can determine that the reporting pin is used by another logic unit.

In response to determining that there is no other logic unit using the reporting pin, the logic unit reports a first bit of an identifier (ID) of the logic unit (508). The logic unit determines whether the reporting pin represents a same bit value (510), e.g., based on a comparing result from the reporting unit as discussed above with respect to FIG. 2B or 2D. If the reporting pin represents a different bit value, the comparing result is a mismatching result and the logic unit determines that the first bit fails to be sent to the reporting pin. In response, the logic unit disables a reporting drive signal (512) to stop reporting the ID of the logic unit to the reporting unit and returns to step 504.

If the reporting pin represents the same bit value, the comparing result is a matching result and the logic unit determines that the first bit is successfully sent to the reporting pin and continues to send a next bit of the ID of the logic unit. The logic unit determines whether there is a next bit to be sent for the ID of the logic unit (514). If there is a next bit to be sent, the process 500 returns to step 508 and the logic unit reports the next bit. If there is no bit to be sent, the process 500 ends (516), which indicates that the ID of the logic unit has been sent to the controller via the reporting pin. Accordingly, the controller can update a status of the logic unit, e.g., in a logic unit status register such as 212a or 212b of FIG. 2A or 264a or 264b of FIG. 2C.

In some embodiments, logic units in a device report their statues to a controller according to a reporting protocol. For example, The reporting protocol can be a synchronous protocol (with or without a reporting clock signal) or an asynchronous reporting protocol. For illustration, FIGS. 6A-6E show different reporting protocols. Each logic unit in a memory (e.g., 116 of FIG. 1, 220 of FIG. 2A, or 270 of FIG. 2C) can be the logic unit 224a, 224b of FIG. 2A, 230 of FIG. 2B, the 272a, 274a, 272b, 274b of FIG. 2C, or LUN_0, LUN_1, . . . , or LUN_N of FIG. 2D. The logic unit reports its status by sending its ID through a reporting unit (e.g., the reporting unit 222 of FIG. 2A or 240 of FIG. 2B, or the reporting unit 290 of FIG. 2D) and a reporting pin (or ACK pin such as 205 of FIGS. 2A-2B or the reporting pin 277a, 277b of FIG. 2C or 277 of FIG. 2D) to a controller (e.g., the controller 210 of FIG. 2A or the controller 262 of FIG. 2C). The logic unit can also include a reporting drive node (or ACK_DRV node such as 236 of FIG. 2B or 286 of FIG. 2D) and a reporting trigger node (or ACK_TRI node such as 234 of FIG. 2B or 284 of FIG. 2D). The memory can include a reporting clock pin (e.g., 204 of FIG. 2A) for receiving a reporting clock signal from the controller as a reference clock signal. The reporting pin and the reporting clock pin can function together as a reporting bus (e.g., the reporting bus 206 of FIG. 2A or 2B).

Figure 6A:
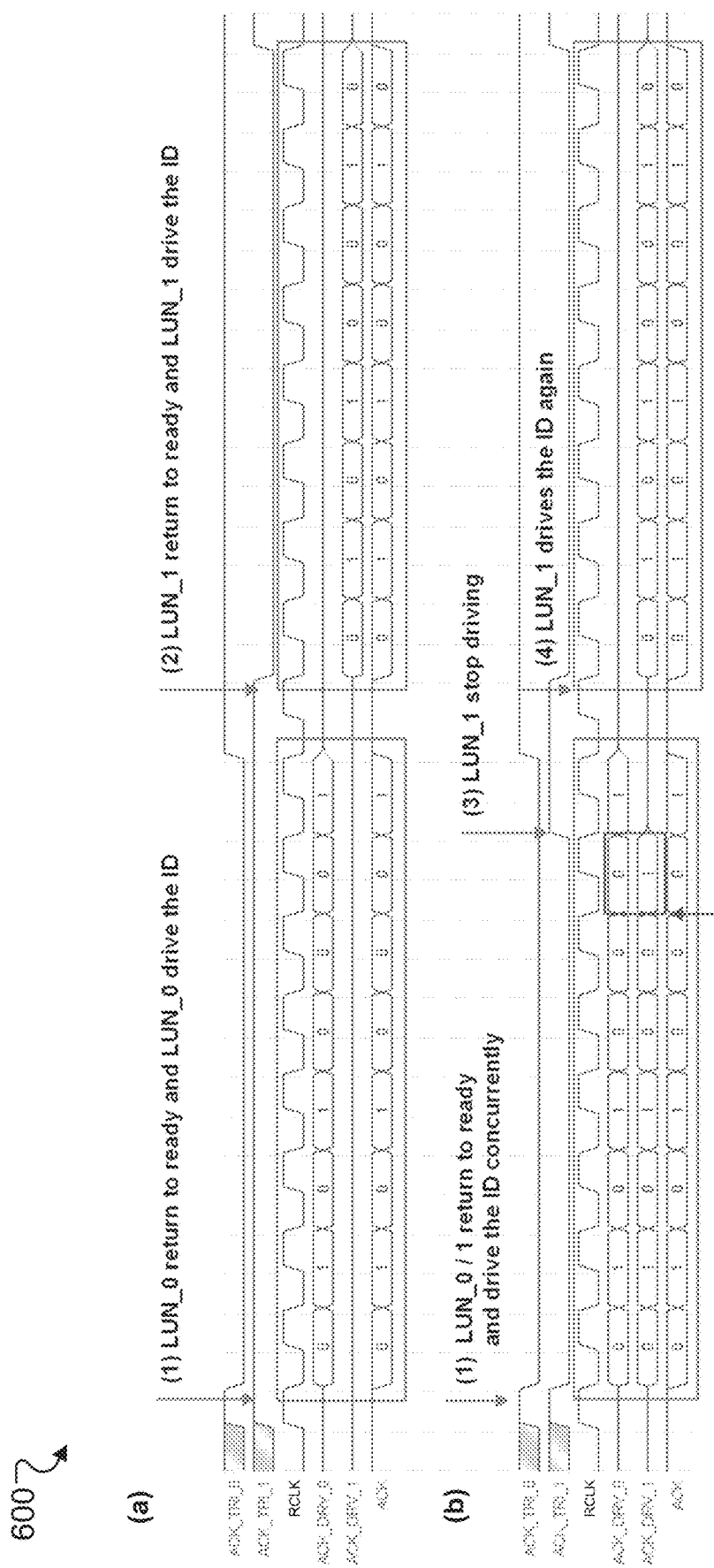
FIG. 6A is a timing diagram showing a synchronous protocol for logic units reporting status information with a reporting clock signal, according to one or more embodiments of the present disclosure.

FIG. 6A is a timing diagram 600 showing a synchronous protocol for logic units reporting status information with a reporting clock signal, according to one or more embodiments of the present disclosure.

Diagram (a) shows a scenario where two logic units LUN_0 and LUN_1 sequential report their statues to the reporting pin (or ACK pin) by sequentially sending their IDs to the reporting pin. The logic units LUN_0, LUN_1 receive the reporting clock signal from the controller through the reporting clock pin. At stage (1), logic unit LUN_0 returns to a ready status and sends its ID to the reporting pin. For example, logic unit LUN_0 sends a reporting trigger signal, e.g., a low level signal, to a buffer in the reporting unit (e.g., to the buffer 242 of FIG. 2B) so that the buffer for logic unit LUN_0 is turned on for reporting. In contrast, a reporting trigger signal from logic unit LUN_1 is kept high to turn off a buffer for logic unit LUN_1. Logic unit LUN_0 sends its ID, e.g., by sequentially sending bits "01010001" in the ID at a falling edge of the reporting clock signal, from the reporting driving node (ACK_DRV_0) to the reporting pin. After logic unit LUN_0 completes sending its ID to the controller through the reporting pin, at stage (2), logic unit LUN_1 is in a ready status. Logic unit LUN_1 sends a reporting trigger signal, e.g., a low level signal, to a corresponding buffer in the reporting unit to turn on the buffer for reporting, and sends its ID, e.g., by sequentially sending bits "01010010" of the ID at a falling edge of the reporting clock signal, from the reporting drive node (ACK_DRV_1) to the reporting pin. There is no conflict for the two logic units sending their IDs through the reporting pin to the controller.

Diagram (b) shows another scenario where two logic units LUN_0 and LUN_1 concurrently report their statuses to the reporting pin (or ACK pin) and conflict occurs. At stage (1), both logic units LUN_0 and LUN_1 return to the ready status and start to send their IDs concurrently to the reporting pin. Since the first six bits in their IDs are the same, each of the logic units receives a matching result and there is no conflict. The seventh bit in the ID of LUN_0 is "0", which is different from the seventh bit of the ID of LUN_1, e.g., "1". In some embodiments, the buffer is a tri-sate buffer and can convert bit "0" in the ID of LUN_0 to "1" to turn on the transistor to therefore change the value on the reporting pin to be "0". Therefore, logic unit LUN_0 receives a matching result from the reporting unit and continues to send the eighth bit "1" to the reporting pin, while logic unit LUN_1 receives a mismatching result from the reporting unit and stops sending the ID of LUN_1, e.g., by disabling the trigger signal to the buffer. After determining that there is no logic unit using the reporting pin (e.g., as illustrated in step 506 of FIG. 5), logic unit LUN_1 restarts to send its ID to the reporting pin to the controller.

Figure 6B:
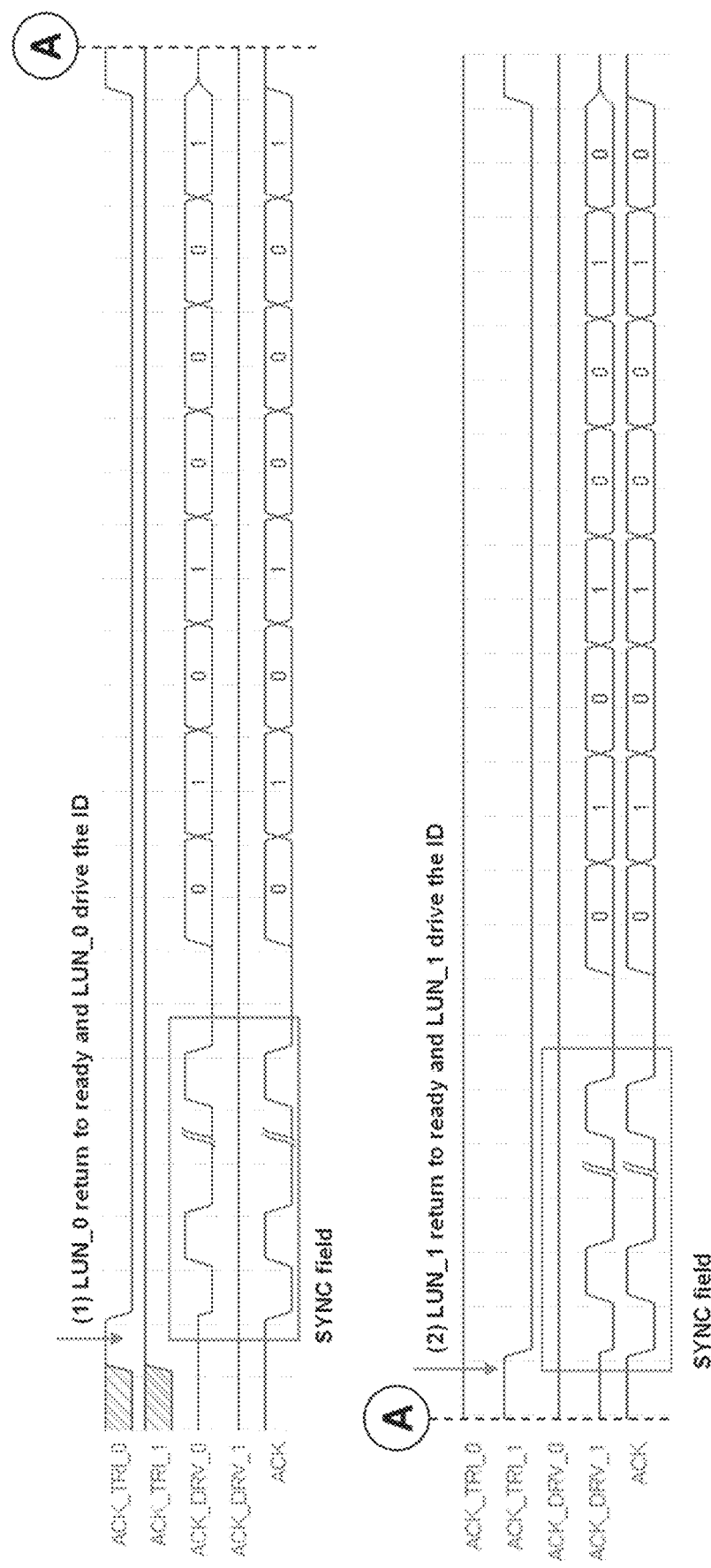
FIG. 6B is a timing diagram showing a synchronous protocol for logic units reporting status information without a reporting clock signal, according to one or more embodiments of the present disclosure.

FIG. 6B is a timing diagram 610 showing a synchronous protocol for logic units reporting status information without a reporting clock signal, according to one or more embodiments of the present disclosure. The synchronous protocol can be similar to a non-return to zero inverted (NRZI) protocol, without using a reporting clock signal as a reference clock signal. Accordingly, the memory does not include a reporting clock pin. The reporting pin (or ACK pin) is a bidirectional pin.

As shown in FIG. 6B, according to the NRZI protocol, before a logic unit LUN_0 or LUN_1 sends its ID to the reporting pin (or ACK pin), the controller sends a synchronization (SYNC) signal, e.g., a start of frame (SOF) packet, to the logic unit through the reporting pin, and the logic unit sends a reporting drive signal to the reporting unit, such that the logic unit can synchronize the reporting drive signal with the synchronization signal during the SYNC field. After that, the logic unit sends its ID based on a frequency of the synchronization signal to the reporting pin.

Figure 6C:
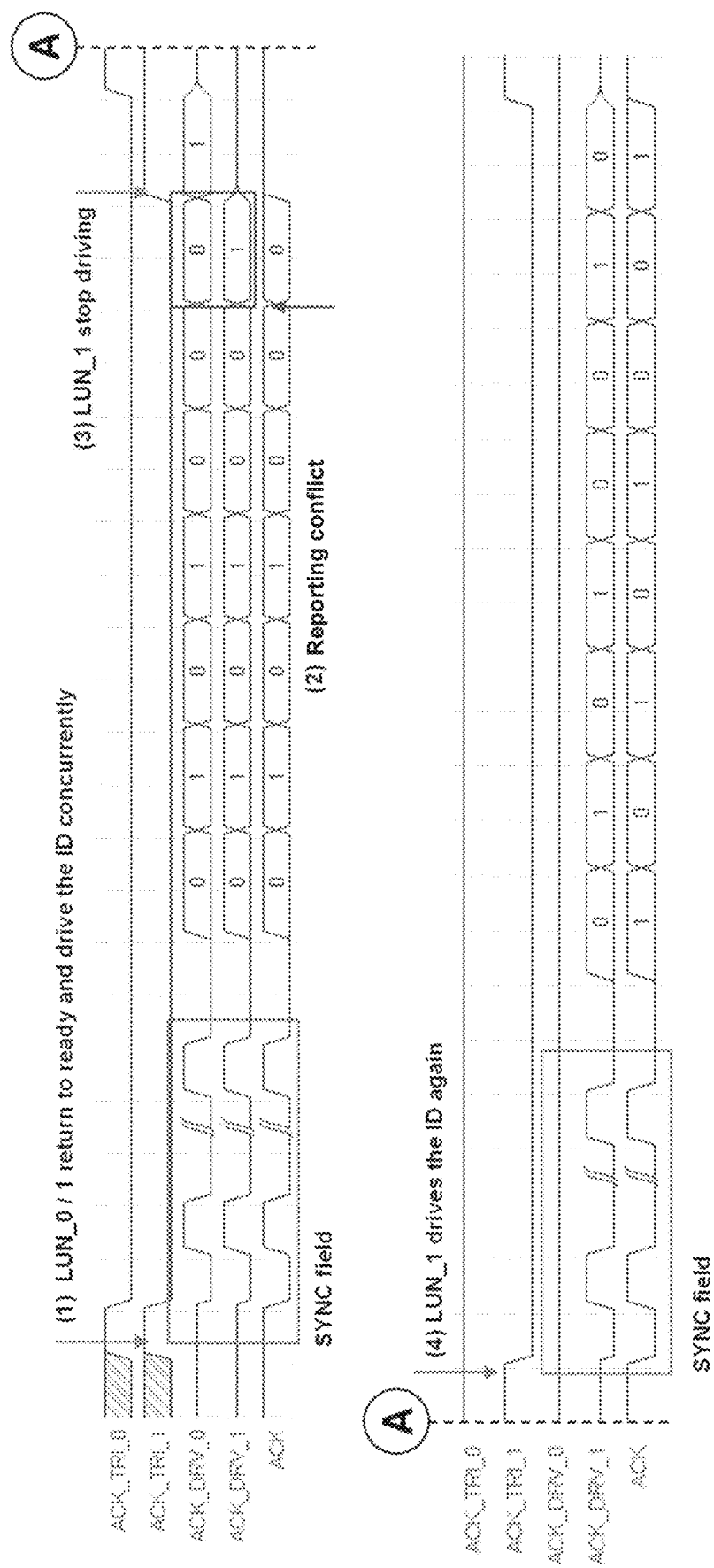
FIG. 6C is a timing diagram showing a synchronous protocol for logic units reporting status information without a reporting clock signal, according to one or more embodiments of the present disclosure.

FIG. 6C is a timing diagram 620 showing a synchronous protocol for logic units reporting status information without a reporting clock signal, according to one or more embodiments of the present disclosure. The synchronous protocol can be a non-return to zero inverted (NRZI) protocol, without using a reporting clock signal as a reference clock signal. Accordingly, the memory does not include a reporting clock pin. The reporting pin (or ACK pin) is a bidirectional pin.

Different from the timing diagram 610 in FIG. 6B, the timing diagram 620 shows two logic units LUN_0, LUN_1 concurrently sending their IDs to the reporting pin. At stage (1), the controller sends a synchronization (SYNC) signal, e.g., a start of frame (SOF) packet, to the reporting pin to synchronize both logic units LUN_0, LUN_1, in the SYNC field. After that, the two logic units LUN_0, LUN_1 starts sending their IDs bit by bit to the reporting pin based on a frequency of the synchronization signal. At stage (2), reporting conflict occurs, e.g., as illustrated in diagram (b) of FIG. 6A, where the seventh bits in their IDs are different. As the seventh bit of logic unit LUN_0 is "0" and the seventh bit of logic unit LUN_1 is "1), logic unit LUN_0 receives a matching result from the reporting unit and continues to send the eighth bit of its ID, while logic unit LUN_1 receives a mismatching result from the reporting unit and stops to send its ID to the reporting unit at stage (3). After logic unit LUN_0 completes its reporting, LUN_1 can send its ID again at stage (4), e.g., as illustrated in FIG. 6B, by first synchronizing with a synchronization signal and then sending its ID to the reporting pin.

Figure 6D:
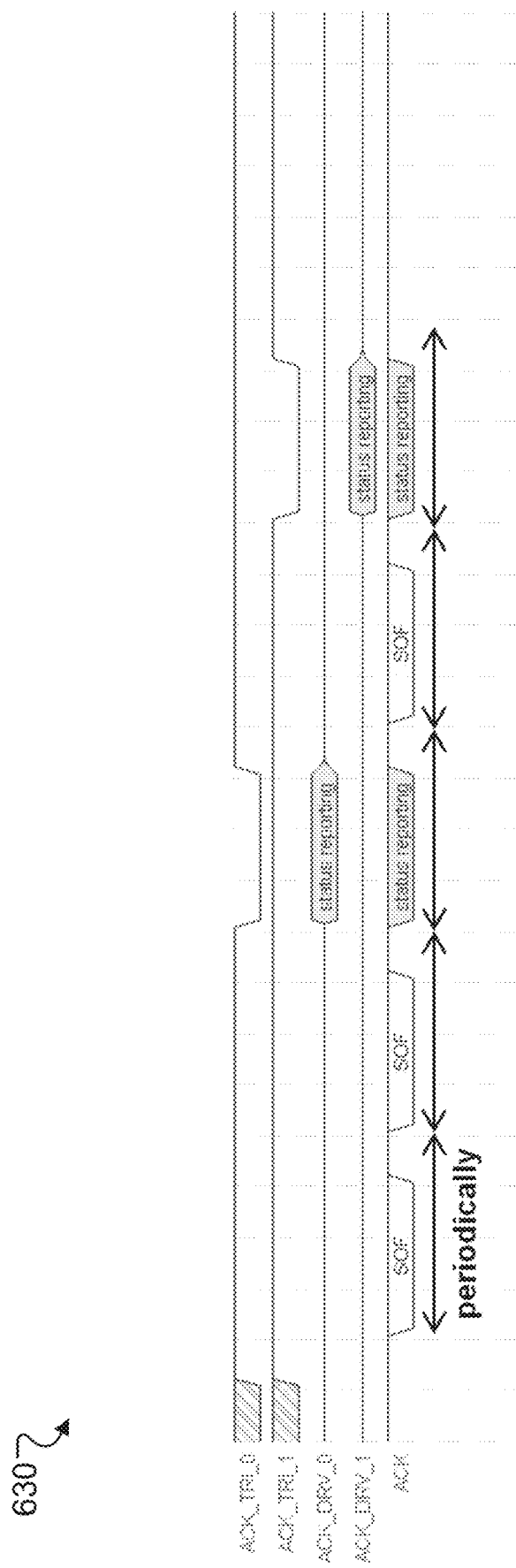
FIG. 6D is a timing diagram showing another synchronous protocol for logic units reporting status information without a reporting clock signal, according to one or more embodiments of the present disclosure.

FIG. 6D is a timing diagram 630 showing another synchronous protocol for logic units reporting status information without a reporting clock signal, according to one or more embodiments of the present disclosure. The synchronous protocol can be a non-return to zero inverted (NRZI) protocol, without using a reporting clock signal as a reference clock signal. Accordingly, the memory does not include a reporting clock pin. The reporting pin (or ACK pin) is a bidirectional pin.

Different from the NRZI protocol described in FIGS. 6B-6C where a synchronization signal is first used for synchronization, according to the NRZI protocol in FIG. 6D, the controller periodically sends SOF packets to logic units through the reporting pin, e.g., 1 millisecond (ms) in a full-speed mode or 125 microsecond (µs) in a high-speed mode. A logic unit, LUN_0 or LUN_1, can synchronize its status reporting based on a frequency of the SOF packets to send its ID to the reporting pin.

In some embodiments, a synchronous action can be performed through a read enable (REB) pin or a write enable (WEB) pin. The synchronous action can be a read operation, a write operation, or a calibration operation. In some cases, the controller can execute a calibration operation when the controller is idle for more than 1 ms.

Figure 6E:
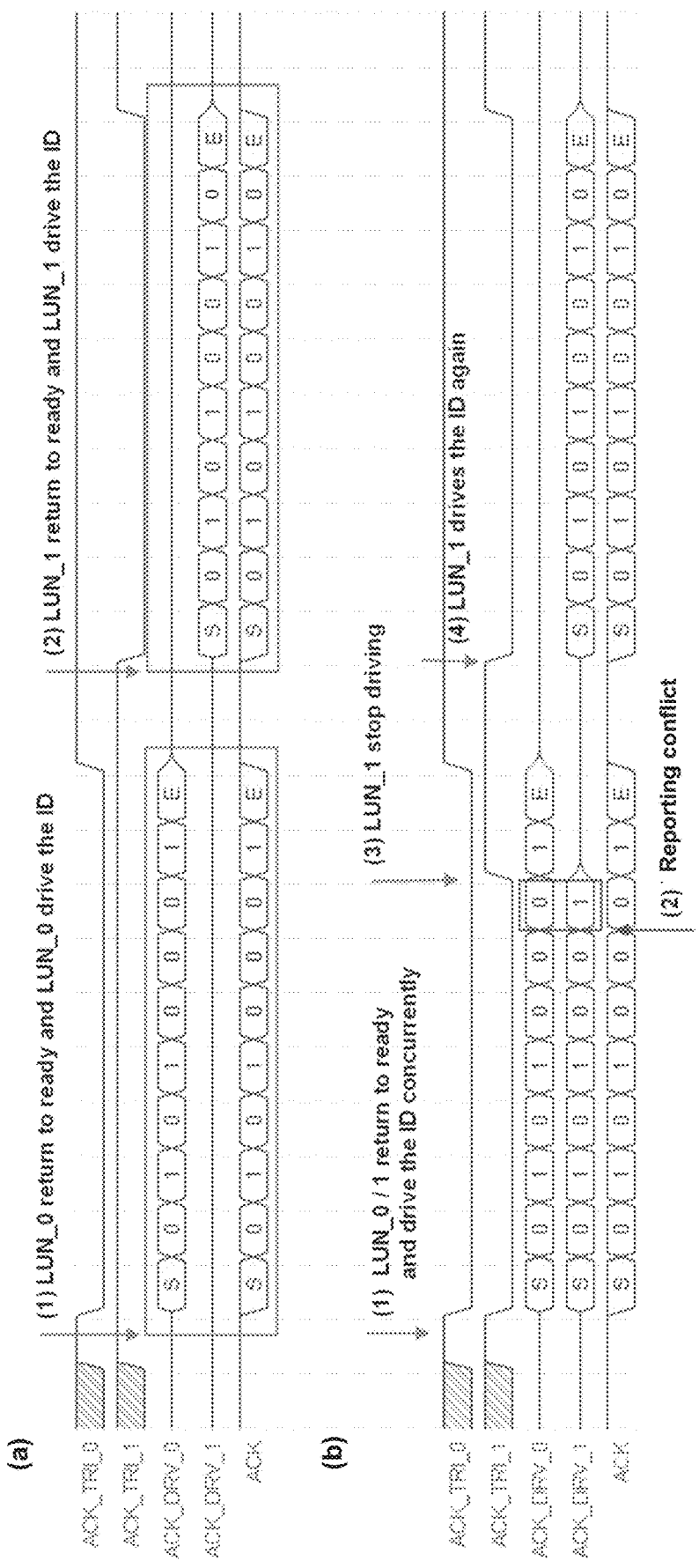
FIG. 6E is a timing diagram showing an asynchronous protocol for logic units reporting status information, according to one or more embodiments of the present disclosure.

FIG. 6E is a timing diagram 640 showing an asynchronous protocol for logic units reporting status information, according to one or more embodiments of the present disclosure. The asynchronous protocol can be assigned with a predefined baud rate, where a reporting clock pin is not needed. According to the asynchronous protocol, a logic unit reports its status by sending its ID between a starting bit "S" and an ending bit "E" at the predefined baud rate. In an example, the starting bit "S" and the ending bit "E" can be "0" and "1".

Diagram (a) in FIG. 6E, similar to diagram (a) in FIG. 6A, shows two logic units LUN_0, LUN_1 sequentially reporting their statuses to the controller through the reporting pin. At stage (1), logic unit LUN_0 returns to a ready status and sends its ID to the reporting pin. At stage (2), logic unit LUN_1 returns to the ready status and sends its ID to the reporting pin.

Diagram (b) in FIG. 6E, similar to diagram (b) in FIG. 6A, shows two logic units LUN_0, LUN_1 concurrently reporting their statuses to the controller through the reporting pin. At stage (1), both logic units return to the ready status and send their IDs to the reporting pin concurrently. Once reporting conflict occurs at stage (2), logic unit LUN_0 receives a matching result and continues to complete reporting, while logic unit LUN_1 receives a mismatching result and stops sending its ID at stage (3). At stage (4), logic unit LUN_1 sends its ID again to the reporting pin.

Figure 7:
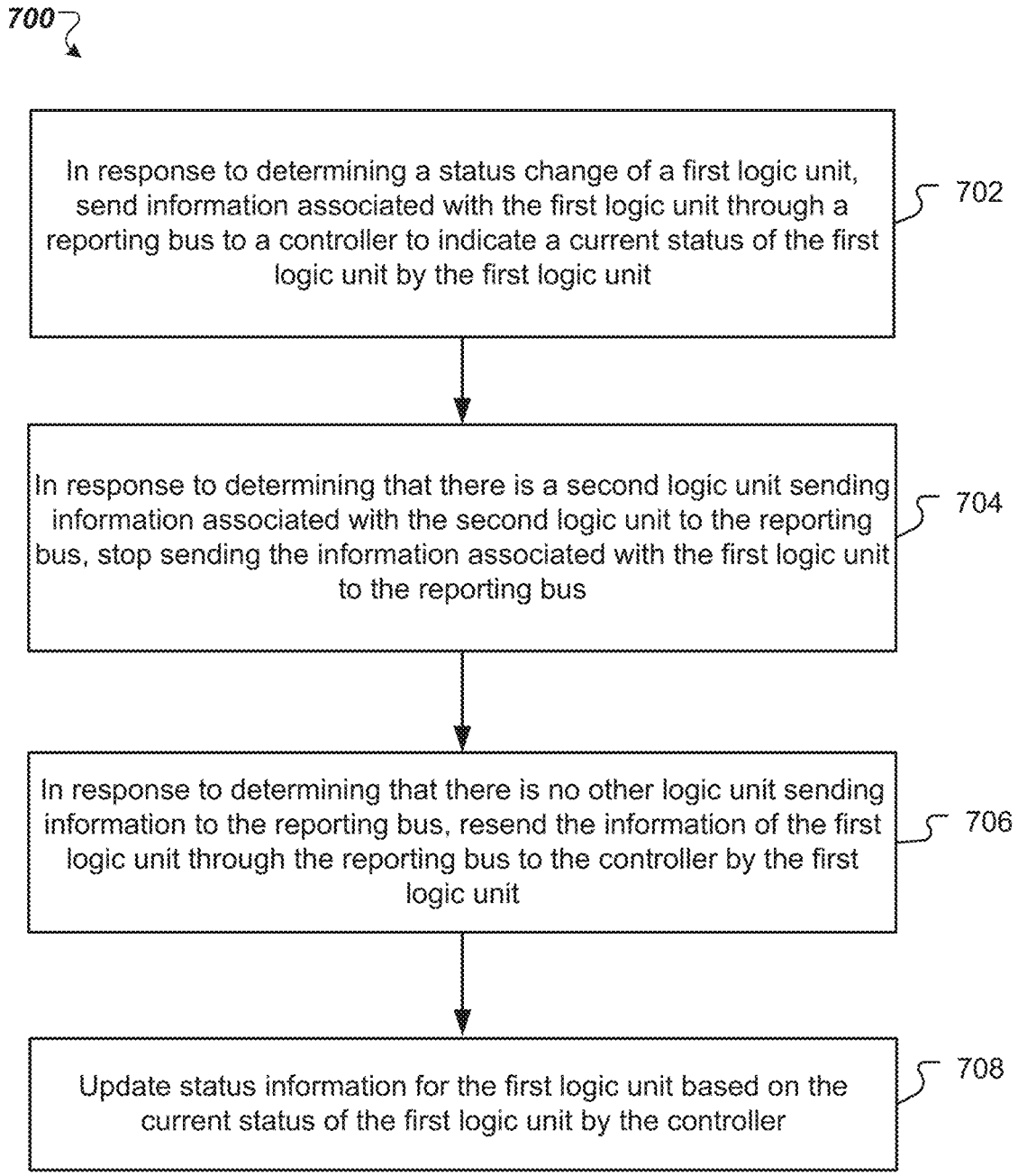
FIG. 7 is a flow chart showing an example of a process for managing status information of logic units in a device, according to one or more embodiments of the present disclosure.

FIG. 7 is a flow chart showing an example of a process 700 for managing status information of logic units in a device, according to one or more embodiments of the present disclosure.

The device can be the device 110 of FIG. 1, the device 200 of FIG. 2A, or the device 260 of FIG. 2C. The device can include a controller (e.g., the device controller 112 of FIG. 1, the controller 210 of FIG. 2A, or the controller 262 of FIG. 2C) and a semiconductor device. The semiconductor device can be the memory 116 of FIG. 1, the memory 220 of FIG. 2A or the memory 270 of FIG. 2C. The semiconductor device can also be the memory unit 220a, 220b of FIG. 2A, the device 250 of FIG. 2B, the memory unit 270a, 270b of FIG. 2C, or the device 280 of FIG. 2D. The semiconductor device can include one or more logic units. A logic unit in the semiconductor device can be 224a, 224b of FIG. 2A or 230 of FIG. 2B, the logic unit 272a, 274a, 272b, 274b of FIG. 2C, or the logic unit LUN_0, LUN_1, . . . , or LUN_N of FIG. 2D.

In some embodiments, the semiconductor device includes a reporting unit (e.g., 222 of FIG. 2A or 240 of FIG. 2B) shared by logic units in the semiconductor device and coupled to the controller through a reporting pin (or ACK pin) (e.g., 205 of FIG. 2A or 2B) and optionally a reporting clock pin (e.g., 204 of FIG. 2A). The reporting pin and the reporting clock pin can function as a reporting bus (e.g., the reporting bus 206 of FIGS. 2A-2B). The controller can send a reporting clock signal through the reporting clock pin to the memory as a reference clock signal for reporting.

In some embodiments, each logic unit in the semiconductor device includes a respective reporting unit (e.g., the reporting unit 290 of FIG. 2D) that is individually coupled to a common reporting bus (or pin) (e.g., 277a or 277b of FIG. 2C or 277 of FIG. 2D). In some embodiments, the semiconductor device includes a first reporting unit shared by two or more logic units, and the remaining logic unit(s) has a respective reporting unit.

In some embodiments, each logic unit in the semiconductor device includes a control logic (e.g., the control logic 232 of FIG. 2B or 282 of FIG. 2D). In some embodiments, the reporting pin is a ready/busy (R/B #) pin shared by the one or more logic units in the semiconductor device. In some embodiments, the reporting pin is an additional pin different from a ready/busy (R/B #) pin shared by the one or more logic units in the semiconductor device.

The controller is configured to store status information of the one or more logic units in the semiconductor device. Each of the one or more logic units is configured to send information associated with the logic unit through a corresponding reporting unit to the controller to indicate a status of the logic unit, and the controller is configured to, in response to receiving the information associated with the logic unit, update corresponding status information of the logic unit based on the status of the logic unit.

In some embodiments, the reporting unit includes a comparator (e.g., the comparator 248 of FIG. 2B or 298 of FIG. 2D) for a logic unit. The comparator includes: a first input coupled to the reporting pin, a second input coupled to the logic unit, and an output coupled to the logic unit. The comparator is configured to output a comparing result between first data on the first input from the reporting pin and second data on the second input from the logic unit.

In some embodiments, the reporting unit further includes a buffer (e.g., the buffer 242 of FIG. 2B or 292 of FIG. 2D) having: a buffer input configured to receive the information of the logic unit from the logic unit, a trigger input configured to receive a trigger signal from the logic unit, and a buffer output configured to output the information of the logic unit when the trigger signal is on. The reporting unit can further include a transistor (e.g., the transistor 244 of FIG. 2B or the transistor 294 of FIG. 2D) including a gate terminal coupled to the buffer output of the buffer, a first terminal coupled to the reporting pin, and a second terminal coupled to a ground. The logic unit is configured to enable or disable the buffer using the trigger signal to the trigger input of the buffer. The reporting unit can further include a buffer (e.g., the buffer 246 of FIG. 2B or 296 of FIG. 2D) coupled between the first terminal of the transistor and the first input of the comparator.

In some embodiments, the logic unit (or the control logic of the logic unit) includes: a first node (e.g., the reporting drive node 236 of FIG. 2B or 286 of FIG. 2D) coupled to the buffer input and configured to provide the information of the logic unit to the buffer input, a second node (e.g., the reporting trigger node 234 of FIG. 2B or 284 of FIG. 2D) coupled to the trigger input of the buffer and configured to provide the trigger signal to the trigger input, and a third node (e.g., the matching result node 238 of FIG. 2B or 288 of FIG. 2D) coupled to the output of the comparator and configured to receive the comparing result from the output of the comparator of the reporting unit. The logic unit can be configured to determine whether there is another logic unit sending conflict information to the reporting pin based on the comparing result from the comparator. The trigger signal is at a high level when the logic unit is in a ready status and at a low level when the logic unit is in a busy status.

Referring to FIG. 7, a first logic unit sends information associated with the first logic unit through the reporting bus (e.g., the reporting pin) to the controller in response to determining a status change of the first logic unit (702). For example, the status change can be from a first status to a second status. The first status can be a busy status, and the second status can be a ready status. For example, the first logic unit may complete an operation and return to the ready status. The first logic unit is configured to send the information associated with the first logic unit without receiving a status query command from the controller.

In some embodiments, as illustrated in FIG. 5, the first logic unit first checks whether there is another logic unit using the reporting pin, e.g., by checking a signal level on the reporting pin. In response to determining that there is no logic unit using the reporting pin, the first logic unit starts to send the information associated with the first logic unit to the reporting bus through a corresponding reporting unit.

The information associated with the first logic unit can include an identifier of the first logic unit. The identifier can be a unique identifier of the first logic unit or a specific identifier defined for the first logic unit. In some embodiments, the identifier includes a series of bits, and the first logic unit is configured to send the identifier of the first logic unit by sequentially sending the series of bits to the reporting bus.

The first logic unit can send the information of the first logic unit according to a reporting protocol. For example, the reporting protocol can be a synchronous protocol (with or without a reporting clock signal) or an asynchronous reporting protocol.

In some embodiments, as illustrated in FIG. 6A, the controller is configured to provide a reporting clock signal via the reporting clock pin to each of the one or more logic units. The first logic unit can send the information of the first logic unit at a frequency of the reporting clock signal.

In some embodiments, the reporting protocol is an NRZI protocol without using a reporting clock signal and a reporting clock pin. As illustrated in FIG. 6B or 6C, the controller is configured to send a synchronization signal to each of the one or more logic units through the reporting bus. The first logic unit is configured to: in response to determining that the first logic unit is in a ready status, receive the synchronization signal, and send information of the first logic unit based on a frequency of the synchronization signal to the controller via the reporting pin.

In some embodiments, the reporting protocol is an NRZI protocol without using a reporting clock signal and a reporting clock pin. As illustrated in FIG. 6D, the controller is configured to periodically send a start-of-frame (SOF) packet to the one or more logic units through the reporting pin, and the first logic unit is configured to send the information of the logic unit at a frequency of the SOF packet to the reporting pin.

In some embodiments, the reporting protocol is an asynchronous protocol. According to the asynchronous protocol, as illustrated in FIG. 6E, the first logic unit is configured to send the information associated with the first logic unit between a starting bit and an ending bit to the controller at a predefined baud rate.

A second logic unit may also return to a ready status and concurrently send information associated with the second logic unit to the reporting bus, e.g. as illustrated in FIG. 6A, 6C, or 6E.

The first logic unit stops sending the information associated with the first logic unit to the reporting bus in response to determining that the second logic unit sending the information associated with the second logic unit to the reporting bus (704).

In some embodiments, the information associated with the first logic unit includes a series of first bits, and the information associated with the second logic unit includes a series of second bits. The first logic unit can determine that there is the second logic unit sending the information associated with the second logic unit to the reporting bus by determining a value of a first bit in the series of first bits to be sent to the reporting pin is different from a bit value on the reporting pin that is same as a value of a second bit in the series of the second bits.

In some embodiments, the first logic unit is configured to determine whether the value of the first bit in the series of bits sent to the reporting bus matches the value on the reporting pin based on the comparing result from the output of the comparator. If the value of the first bit matches the value on the reporting pin, the first logic unit determines that the first bit is successfully sent to the controller through the reporting pin and sends a second bit sequential to the first bit in the series of bits to the reporting bus. If the value of the first bit is different from the value on the reporting pin, the first logic unit determines that there is another logic unit using the reporting pin, and stops sending the series of bits.

In some embodiments, a number of the series of first bits is identical to a number of the series of second bits, and an order of the first bit in the series of first bits is same as an order of the second bit in the series of second bits. In some cases, the value of the first bit is "1", and the value of the second bit is "0." When both of the first bit and the second bit are sent to the reporting pin, the first logic unit receives a mismatching result from the reporting unit and can stop sending the information of the first logic unit. In contrast, the second logic unit receives a matching result from the reporting unit and can continue to complete sending the remaining bit(s) in its identifier.

The first logic unit resends the information of the first logic unit through the reporting bus to the controller in response to determining that there is no other logic unit sending information to the reporting bus (706), e.g., after the second logic unit completes sending its identifier.

In response to receiving the information of the first logic unit, the controller updates status information of the first logic unit based on the current status of the first logic unit (708). In some cases, the first logic unit sends the information of the first logic unit when the first logic unit returns to the ready status.

In some embodiments, the controller includes a logic unit status register (e.g., 212*a* or 212*b* of FIG. 2A or 264*a* or 264*b* of FIG. 2B) storing one or more bits. Each of the one or more bits having a respective value indicating a status of a corresponding logic unit of the one or more logic units, e.g., as illustrated in FIG. 4. In some cases, a value "1" indicates a ready status, and "0" indicates a busy status.

In some embodiments, the first logic unit is configured to send the information of the first logic unit at a falling edge of the reporting clock signal, and the controller is configured to update the corresponding status information of the first logic unit at the falling edge of the reporting clock signal after completely receiving the information of the first logic unit.

In some embodiments, the controller is configured to: change a status of a logic unit from a busy status to a ready status at a falling edge of the reporting clock signal, and change a status of a logic unit from the ready status to the busy status at a rising edge of the reporting clock signal.

In some embodiments, as illustrated in FIG. 3, the controller is configured to: determine that the first logic unit is in a ready status based on a value of a first bit corresponding to the first logic unit in the logic unit status register, send an operation command to the first logic unit, and in response to sending the operation command to the first logic unit, change the value of the first bit to indicate that the first logic unit is in a busy status. The first logic unit can be configured to: in response to completing an operation corresponding to the operation command, send information associated with the first logic unit through the reporting bus to the controller to indicate that the first logic unit is in the ready status. The controller can be further configured to: in response to receiving the information associated with the first logic unit, change the value of the first bit in the logic unit status register to indicate that the first logic unit is in the ready status.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A semiconductor device comprising:
   one or more logic units; and
   a reporting bus,
   wherein each of the one or more logic units is configured to send out information associated with the logic unit using a corresponding reporting unit through the reporting bus to indicate a status of the logic unit, and wherein the information associated with the logic unit comprises an identifier of the logic unit, and
   wherein the logic unit is configured to:
      perform whether to send out the information of the logic unit through the reporting bus based on a result of determining whether there is another logic unit sending information to the reporting bus,
      in response to determining that there is no other logic unit sending information to the reporting bus, send out information of the logic unit through the reporting bus, and
      in response to determining that a bit value on the reporting bus is different from a bit sent by the logic unit, stop sending the information associated with the logic unit to the reporting bus, and in response to determining that there is no other logic unit sending information to the reporting bus, resend the information of the logic unit to the reporting bus.

2. The semiconductor device of claim 1, wherein each of the one or more logic units comprises the corresponding reporting unit that is individually coupled to the reporting bus.

3. The semiconductor device of claim 1, wherein the corresponding reporting unit is externally coupled to each of the one or more logic units, and coupled between the one or more logic units and the reporting bus.

4. The semiconductor device of claim 1, wherein each of the one or more logic units is configured to:
send the information associated with the logic unit in response to determining a status change of the logic unit from a first status to a second status, without receiving a status query command.

5. The semiconductor device of claim 1, wherein each of the one or more logic units is configured to:
proactively send out the information associated with the logic unit, without receiving a status query command.

6. The semiconductor device of claim 1, wherein the corresponding reporting unit comprises a comparator comprising:
a first input configured to receive first data on the reporting bus,
a second input configured to receive second data from the logic unit, the second data being sent to the reporting bus, and
an output coupled to a control logic of the logic unit,
wherein the comparator is configured to output a comparing result between the first data received by the first input from the reporting bus and the second data received by the second input from the logic unit.

7. The semiconductor device of claim 6, wherein the information of the logic unit comprises a series of bits, and the logic unit is configured to send the information of the logic unit by sequentially sending the series of bits to the reporting bus through the corresponding reporting unit, and
wherein the logic unit is configured to:
determine whether a value on the reporting bus matches a value of a first bit in the series of bits sent to the reporting bus based on the comparing result from the output of the comparator,
in response to determining that the value of the first bit matches the value on the reporting bus, send a second bit sequential to the first bit in the series of bits to the corresponding reporting unit, and
in response to determining that the value of the first bit is different from the value on the reporting bus, stop sending the series of bits.

8. The semiconductor device of claim 6, wherein the corresponding reporting unit further comprises:
a buffer having:
a buffer input configured to receive the information of the logic unit from a first node of the control logic of the logic unit,
a trigger input configured to receive a trigger signal from a second node of the control logic of the logic unit, and
a buffer output configured to output data associated with the information of the logic unit when the trigger signal is on, and
a transistor comprising a gate terminal coupled to the buffer output of the buffer, a first terminal coupled to the reporting bus, and a second terminal coupled to a ground,
wherein the output of the comparator is coupled to a third node of the control logic of the logic unit, and
wherein the control logic of the logic unit is configured to determine whether there is another logic unit sending conflict information to the reporting bus based on the comparing result received through the third node of the control logic.

9. The semiconductor device of claim 8, wherein the transistor is an n-type transistor, and
wherein the semiconductor device further comprises a pull-up unit coupled to a node between the first terminal of the transistor and the reporting bus, the pull-up unit being configured to pull up the reporting bus to a high level if none of the one or more logic units is busy.

10. The semiconductor device of claim 1, further comprising a reporting clock pin,
wherein each of the one or more logic units is configured to receive a reporting clock signal via the reporting clock pin.

11. The semiconductor device of claim 10, wherein the logic unit is configured to send the information of the logic unit at a frequency of the reporting clock signal.

12. A device, comprising:
a semiconductor device comprising one or more logic units and a reporting bus; and
a controller coupled to the semiconductor device and configured to store status information of the one or more logic units in the semiconductor device,
wherein each of the one or more logic units is configured to send information associated with the logic unit using a corresponding reporting unit in the semiconductor device through the reporting bus to the controller to indicate a status of the logic unit, and is configured to perform whether to send out the information associated with the logic unit through the reporting bus based on a result of determining whether there is another logic unit sending information to the reporting bus,
wherein the controller is configured to, in response to receiving the information associated with the logic unit, update corresponding status information of the logic unit based on the status of the logic unit, and send a synchronization signal to each of the one or more logic units through the corresponding reporting unit according to a predetermined protocol, and
wherein the one or more logic units comprise a logic unit configured to:
in response to determining that the logic unit is in a ready status, receive the synchronization signal from the controller, and send information of the logic unit based on a frequency of the synchronization signal to the controller through the reporting bus,
in response to determining that there is no other logic unit sending information to the reporting bus, send out information of the logic unit through the reporting bus,
in response to determining that there is information of another logic unit on the reporting bus, stop sending the information of the logic unit, and
in response to determining that there is no information of other logic units on the reporting bus, resend the information of the logic unit to the controller via the reporting bus.

13. The device of claim 12, wherein each of the one or more logic units is configured to:
send the information associated with the logic unit in response to determining a status change of the logic unit from a first status to a second status, without receiving a status query command from the controller.

14. The device of claim 12, wherein the controller is configured to periodically send a start-of-frame (SOF) packet to the one or more logic units through the reporting bus, and
wherein the logic unit is configured to send the information of the logic unit at a frequency of the SOF packet to the reporting bus.

15. The device of claim 12, wherein each of the one or more logic units is configured to communicate with the controller according to an asynchronous protocol, and
wherein the logic unit is configured to send the information associated with the logic unit between a starting bit and an ending bit to the controller at a predefined baud rate.

16. The device of claim 12, wherein the controller comprises a logic unit status register storing one or more bits, each of the one or more bits having a respective value indicating a status of a corresponding logic unit of the one or more logic units.

17. The device of claim 16, wherein the controller is configured to:
determine that a first logic unit is in a ready status based on a value of a first bit corresponding to the first logic unit in the logic unit status register,
send an operation command to the first logic unit, and
in response to sending the operation command to the first logic unit, change the value of the first bit to indicate that the first logic unit is in a busy status.

18. The device of claim 12, wherein the semiconductor device further comprises an interface coupled to the one or more logic units, the interface comprising:
one or more unit select pins each coupled to a respective logic unit and configured to select a respective logic unit based on a select signal from a controller, and
a data bus coupled to the one or more logic units and configured to transfer data between the one or more logic units and the controller.

19. A device comprising:
a memory comprising one or more memory units, each of the one or more memory units comprising:
one or more logic units and
a reporting bus coupled to the one or more logic units; and
a controller coupled to the memory and configured to store status information of the one or more logic units in each of the one or more memory units,
wherein each of the one or more logic units in each of the one or more memory units is configured to:
in response to determining a status change of the logic unit in the memory unit, send information associated with the logic unit to the controller through the reporting bus in the memory unit to indicate a current status of the logic unit,
perform whether to send out the information associated with the logic unit through the reporting bus based on a result of determining whether there is another logic unit sending information to the reporting bus,
in response to determining that there is no other logic unit sending information to the reporting bus, send out information of the logic unit through the reporting bus, and
in response to determining that a bit value on the reporting bus is different from a bit sent by the logic unit, stop sending the information associated with the logic unit to the reporting bus, and in response to determining that there is no other logic unit sending information to the reporting bus, resend the information of the logic unit to the reporting bus, and
wherein the controller is configured to:
in response to receiving the information associated with the logic unit, update corresponding status information of the logic unit based on the current status of the logic unit.

20. The device of claim 19, wherein each of the one or more logic units comprises a respective reporting unit that is individually coupled to the reporting bus, and is configured to send the information associated with the logic unit through the respective reporting unit and the reporting bus to the controller.

21. The device of claim 19, wherein each of the one or more memory units further comprises a reporting unit that is coupled to each of the one or more logic units and coupled between the one or more logic units and the reporting bus, and wherein each of the one or more memory units is configured to send the information associated with the logic unit through the reporting unit and the reporting bus to the controller.

22. The device of claim 19, wherein each of the one or more logic units is configured to:
send the information associated with the logic unit in response to determining a status change of the logic unit from a first status to a second status, without receiving a status query command from the controller.

* * * * *